(12) United States Patent
Nishizawa et al.

(10) Patent No.: US 8,739,217 B2
(45) Date of Patent: May 27, 2014

(54) INFORMATION PROCESSING APPARATUS, TUNER, AND INFORMATION PROCESSING METHOD

(75) Inventors: Manabu Nishizawa, Tokyo (JP); Yuki Kobayashi, Kanagawa (JP); Kensaku Ishizuka, Tokyo (JP); Masakazu Hayashi, Tokyo (JP); Takashi Umeda, Tokyo (JP); Takahiro Moriyama, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 13/502,552

(22) PCT Filed: Oct. 27, 2010

(86) PCT No.: PCT/JP2010/006353
§ 371 (c)(1),
(2), (4) Date: Jun. 22, 2012

(87) PCT Pub. No.: WO2011/052199
PCT Pub. Date: May 5, 2011

(65) Prior Publication Data
US 2012/0249876 A1    Oct. 4, 2012

(30) Foreign Application Priority Data

Oct. 30, 2009   (JP) .................................. 2009-249940

(51) Int. Cl.
*H04N 5/445*    (2011.01)
*G06F 13/00*    (2006.01)
*G06F 3/00*     (2006.01)

(52) U.S. Cl.
USPC ................................ 725/43; 725/41; 725/46

(58) Field of Classification Search
USPC .......................................... 725/40, 41, 43, 46
See application file for complete search history.

(56) References Cited

U.S. PATENT DOCUMENTS 7,962,935 B2   6/2011   Kurosaki
8,081,863 B2   12/2011  Nomura
(Continued)

FOREIGN PATENT DOCUMENTS

CN    1685713 A    10/2005
EP    1549055 A1   6/2005
(Continued)

OTHER PUBLICATIONS

"justin.tv"   http://web.archive.org/web/20081101203347/http://www.justin.tv/04ym?, Mar. 2008, entire document.*

(Continued)

*Primary Examiner* — Hunter B Lonsberry
(74) *Attorney, Agent, or Firm* — Matthew B. Dernier, Esq.; Gibson & Dernier LLP

(57) ABSTRACT

An information processing apparatus includes: a portal screen displaying unit configured to display a portal screen that serves as a source of transition for a plurality of screens related to the viewing of a program on a predetermined display device; an indicator acquisition unit configured to acquire an indicator indicative of the number of viewers viewing a program being broadcast from an information management server; and a popularity determination unit configured to determine the popularity of the program being broadcast in accordance with the indicator. The portal screen displaying unit displays on the portal screen an object to be selected to transition to a screen for viewing the program being broadcast and displays information indicating the popularity of the program.

14 Claims, 21 Drawing Sheets

(56) References Cited

U.S. PATENT DOCUMENTS

| | | |
|---|---|---|
| 2002/0112239 A1 | 8/2002 | Goldman |
| 2006/0010470 A1 | 1/2006 | Kurosaki |
| 2007/0201824 A1 | 8/2007 | Masaki |
| 2008/0127241 A1 | 5/2008 | Garcea |
| 2008/0222106 A1 | 9/2008 | Rao |
| 2009/0148133 A1 | 6/2009 | Nomura |
| 2009/0158340 A1 | 6/2009 | Patel |

FOREIGN PATENT DOCUMENTS

| | | | |
|---|---|---|---|
| JP | 2002010153 A | | 1/2002 |
| JP | 2002218369 A | | 8/2002 |
| JP | 2003153304 A | | 5/2003 |
| JP | 2003235010 A | | 8/2003 |
| JP | 2005033600 A | | 2/2005 |
| JP | 2006094406 A | | 4/2006 |
| JP | 2007193627 A | | 8/2007 |
| JP | 2007214663 A | | 8/2007 |
| JP | 2007312173 A | | 11/2007 |
| JP | 2008252817 A | | 10/2008 |
| KR | 20050061934 A | | 6/2005 |
| WO | 2004032491 A1 | | 4/2004 |
| WO | 2005074275 A1 | | 8/2005 |

OTHER PUBLICATIONS

International Search Report for corresponding PCT Application PCT/JP2010/006353, dated Nov. 22, 2010.
International Preliminary Report on Patentability and Written Opinion for corresponding PCT Application PCT/JP2010/006353, dated Jun. 12, 2012.
European search report issued for corresponding European Patent Application No. 10826335.1, dated May 7, 2013.
Office Action issued for corresponding Japanese Patent Application No. 2011-538250, dated Aug. 20, 2013.
Office Action issued for corresponding Russian Patent Application No. 2012121967/20 (033301), dated Nov. 8, 2013.
Office Action issued for corresponding Chinese Patent Application No. 201080045761.9, dated Feb. 26, 2014.

* cited by examiner

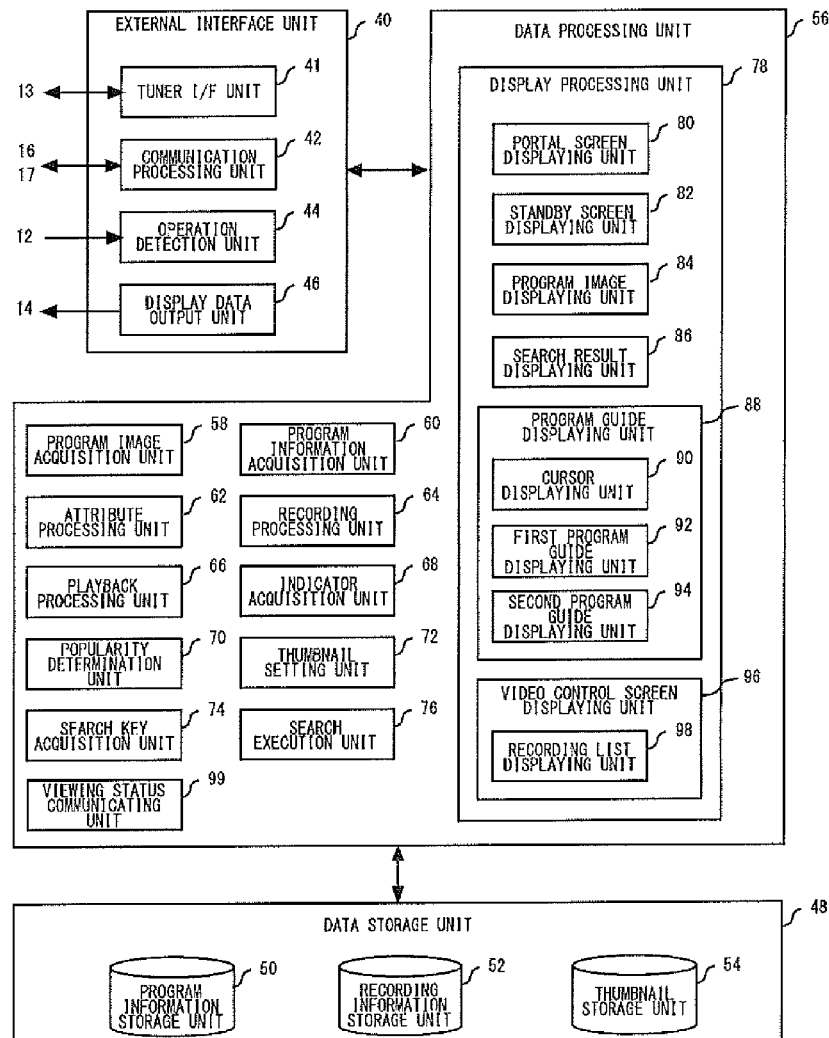

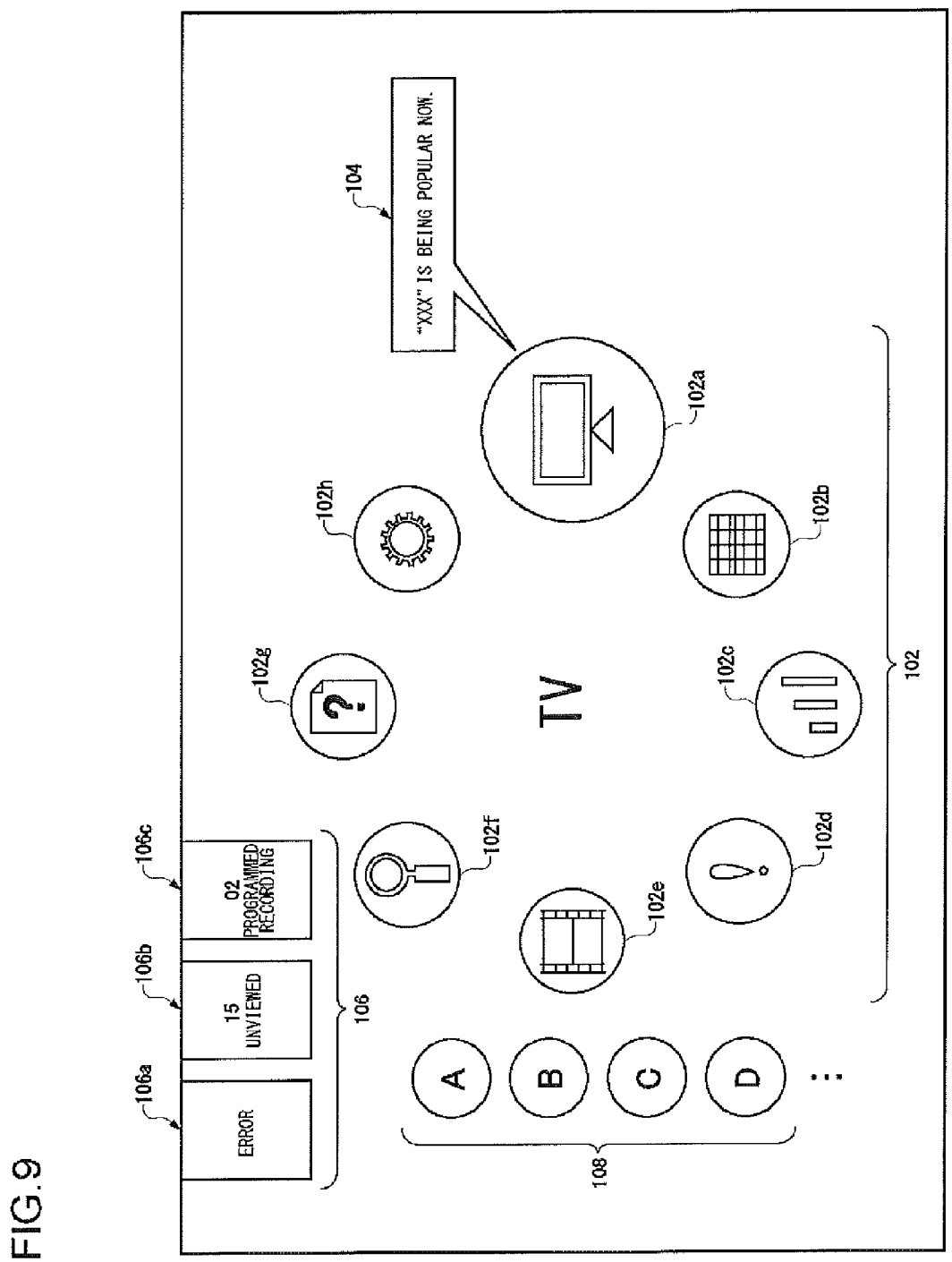

FIG.14

(rotated 90°; program guide grid showing channels CH. X1 (01), CH. X3 (02), CH. X4 (03), CH. X2 (04) with hourly rows 16–23, 0–15; highlighted cell 132 at channel 02, hour 20: "(30) EXPLORATION! IN-DEPTH LOOK INTO HUMAN ORIGIN 2009 MARKS THE 150TH ANNIVERSARY OF 'ORIGIN OF SPECIES' BY DARWIN. HOW THE MYSTERY OF EVOLUTION"; callout 134: "THE MYSTERY OF EVOLUTION OF LIVE BEEN UNRAVELED? CREATURES ON EARTH HAVE EVOLVED OVER 3.5 BILLION YEARS…")

FIG.18A

| | 01 CH. X1 | 02 CH. X3 | 03 CH. X4 | 04 CH. X2 | |
|---|---|---|---|---|---|
| | 146 | 147 | | 148 | |
| 16 | (00) HIGH SCHOOL SOCCER FINALLY, THE SEMI-FINAL. 1ST GROUP OF SEMI-FINAL, AGGRESSIVE HIGH SCHOOL A VS. DEFENSIVE HIGH SCHOOL B. 2ND GROUP OF SEMI-FINAL, EASY FAVORITE HIGH SCHOOL C. | (00) TODAY'S MENU | (00) DRAMA AAA aaaaaaaaaaaaaaaaaaaaa aa | (00) SAMURAI DRAMA BBB bbbbbbbbbbbbbb | |
| 17 | | (30) DRAMA THEATER STIRRING FINAL EPISODE… DON'T MISS THE DRAMATIC ENDING ! | (00) PROGRAM TITLE PROGRAM SUMMARY | (00) PROGRAM TITLE PROGRAM SUMMARY | |
| 18 | (00) EVENING NEWS STRAIGHTFORWARD COMMENTARY ON LATEST NEWS | (30) EVENING NEWS BRINGS YOU ACCURATE INFORMATION | (30) PROGRAM TITLE | | |
| 19 | (30) XX GOTEN MAGICAL TALK SHOW HOSTS MEETS 12… | (00) ASK XX PEOPLE QUIZ SHOW | (00) PROGRAM TITLE PROGRAM SUMMARY | (00) PROGRAM TITLE PROGRAM SUMMARY | |
| 20 | | (30) EXPLORATION! IN-DEPTH LOOK INTO HUMAN ORIGIN 2009 MARKS THE 150TH ANNIVERSARY OF "ORIGIN OF SPECIES" BY DARWIN. HAS THE MYSTERY OF EVOLUTION OF LIFE BEEN UNRAVELED? | (00) PROGRAM TITLE PROGRAM SUMMARY | | |

FIG.18B

| | CH. X1 01 | CH. X3 02 | CH. X4 03 | CH. X2 04 |
|---|---|---|---|---|
| | 146 | 147 | | 148 |
| 17 | (00) HIGH SCHOOL SOCCER FINALLY, THE SEMI-FINAL. 1ST GROUP OF SEMI-FINAL, AGGRESSIVE HIGH SCHOOL A | DON'T MISS THE DRAMATIC ENDING! | (00) PROGRAM TITLE PROGRAM SUMMARY | (00) PROGRAM TITLE PROGRAM SUMMARY |
| 18 | (30) EVENING NEWS STRAIGHTFORWARD COMMENTARY ON LATEST NEWS | (30) EVENING NEWS BRINGS YOU ACCURATE INFORMATION | (30) PROGRAM TITLE | |
| 19 | (00) XX GOTEN MAGICAL TALK SHOW HOSTS MEETS 12… | (00) ASK XX PEOPLE QUIZ SHOW | (00) PROGRAM TITLE PROGRAM SUMMARY | (00) PROGRAM TITLE PROGRAM SUMMARY |
| 20 | | (30) EXPLORATION! IN-DEPTH: LOOK INTO HUMAN ORIGIN 2009 MARKS THE 150TH ANNIVERSARY OF "ORIGIN OF SPECIES" BY DARWIN. HOW THE MYSTERY OF EVOLUTION OF LIFE HAS BEEN UNRAVELED? | | |
| 21 | (00) MONDAY NIGHT SUSPENSE | (00) PROGRAM TITLE PROGRAM SUMMARY | (00) PROGRAM TITLE PROGRAM SUMMARY | (00) PROGRAM TITLE PROGRAM SUMMARY |

FIG.19

| PROGRAM TITLE | RECORDING DATE AND TIME | STATUS | PLAYBACK PROGRESS RATE | |
|---|---|---|---|---|
| AAA | 2009/8/1 19:00 ~2009/8/1 20:58 | RECORDED | 100% | (PLAYBACK) |
| BBB | 2009/8/2 23:00 ~2009/8/2 24:55 | RECORDED | 40% | (PLAYBACK) |
| BBB | 2009/8/3 23:00 ~2009/8/3 24:55 | RECORDED | 0% | (PLAYBACK) |
| CCC | 2009/8/4 12:00 ~2009/8/4 12:52 | ERROR WHILE RECORDING | — | |
| BBB | 2009/8/4 23:00 ~2009/8/4 24:55 | PROGRAMMED | — | |
| ⋮ | ⋮ | ⋮ | ⋮ | |

LIST OR RECORDED CONTENTS 150
152

INFORMATION PROCESSING APPARATUS, TUNER, AND INFORMATION PROCESSING METHOD

TECHNICAL FIELD

The present invention relates to a data processing technology and, more particularly, to a technology for displaying a screen that serves as a source of transition to a plurality of screens related to viewing of a program that is broadcast.

BACKGROUND ART

When an application is started in an information processing device, an entrance screen for calling different functions of the application may be displayed.

An application that provides functions related to viewing of a program often uses a plurality of screens that allows viewers to use different functions (e.g., a viewing screen for viewing of a program, a setting screen for configuration of recording, etc.). We have envisaged that viewer convenience is improved by presenting useful information to viewers on a screen that serves as a source of transition to a plurality of screens related to viewing of a program.

SUMMARY OF THE INVENTION

The present invention is based on our vision described above and a main purpose thereof is to provide a technology capable of presenting useful information to viewers on a screen that servers as a source of transition to a plurality of screens related to viewing of a program.

An information processing apparatus according to one embodiment of the present invention that resolves the problem comprises: a portal screen displaying unit configured to display a portal screen that serves as a source of transition for a plurality of screens related to the viewing of a program on a predetermined display device; an indicator acquisition unit configured to acquire an indicator indicative of the number of viewers viewing a program being broadcast; and a popularity determination unit configured to determine the popularity of the program being broadcast in accordance with the indicator. The portal screen displaying unit displays on the portal screen an object to be selected to transition to a screen for viewing the program being broadcast and displays information indicating the popularity of the program.

Another embodiment of the present invention relates to a tuner. The tuner is adapted to receive a broadcast signal on a selected channel, and comprises: a portal screen displaying unit configured to display a portal screen that serves as a source of transition for a plurality of screens related to the viewing of a program on a predetermined display device; an indicator acquisition unit configured to acquire an indicator indicative of the number of viewers viewing a program being broadcast; and a popularity determination unit configured to determine the popularity of the program being broadcast in accordance with the indicator. The portal screen displaying unit displays on the portal screen an object to be selected to transition to a screen for viewing the program being broadcast and displays information indicating the popularity of the program.

Another embodiment of the present invention relates to an information processing method. The information processing method is executed by an information processing apparatus, and comprises: acquiring an indicator indicative of the number of viewers viewing a program being broadcast; determining the popularity of the program in accordance with the indicator; displaying a portal screen that serves as a source of for transition a plurality of screens related to the viewing of a program on a predetermined display device; and displaying on the portal screen an object to be selected to transition to a screen for viewing the program being broadcast and displays information indicating the popularity of the program.

Optional combinations of the aforementioned constituting elements, and implementations of the invention in the form of apparatuses, methods, systems, programs, and recording mediums storing programs may also be practiced as additional modes of the present invention.

According to the present invention, viewer convenience is improved.

BRIEF DESCRIPTION OF THE DRAWINGS

FIG. 6 is a block diagram showing the functional configuration of the information processing apparatus of FIG. 1;

FIG. 7 shows the structure of data stored in the program information storage unit;

FIG. 8 shows the structure of data stored in the recording information storage unit;

FIG. 9 shows an exemplary portal screen as displayed;

FIG. 14 shows an exemplary second program guide as displayed;

FIG. 18A shows an exemplary second program guide as displayed;

FIG. 18B shows an exemplary second program guide as displayed;

FIG. 19 shows an exemplary video screen showing a list of recordings;

DETAILED DESCRIPTION OF THE INVENTION

An embodiment of the present invention provides a technology of improving the comfort and convenience of a user viewing a program that is being broadcast or a program broadcast in the past. The technology includes the following four technical elements.

A summary of the first technical element will be discussed. Conventional electronic program guides merely present summary information related to programs and defined by broadcasting stations, etc. As such, they are not necessarily convenient to use for viewers. The embodiment provides a technology for providing an electronic program guide that provides excellent usability for viewers. For example, the electronic program guide of the embodiment provides a user interface whereby the convenience for viewers viewing program information is improved.

A summary of the second technical element will be discussed. Currently, Internet connection is available in a growing number of households. Information appliances in possession of a viewer of a program are equipped with the capabilities of exchanging data with a server on the Internet. The embodiment proposes a technology of providing an electronic program guide that is based on data exchange over the Internet and designed to present information useful for viewers as well as mere program summaries. For example, the electronic program guide according to the embodiment presents the popularity ranking of a plurality of programs broadcast in the same time zone.

A summary of the third technical element will be discussed. The embodiment provides a technology that implements a user-friendly user interface in a portal screen that servers as a primary entrance to various functional screens including the display screen of an electronic program guide. For example, the portal screen according to the embodiment provides latest information on program viewing useful for viewers of a program.

A summary of the fourth technical element will be discussed. The embodiment provides a technology that provides a search result useful for a viewer viewing a program. For example, the program viewing screen according to the embodiment displays a result of Internet search using a keyword related to the program along with the image of the program.

Figure 1:
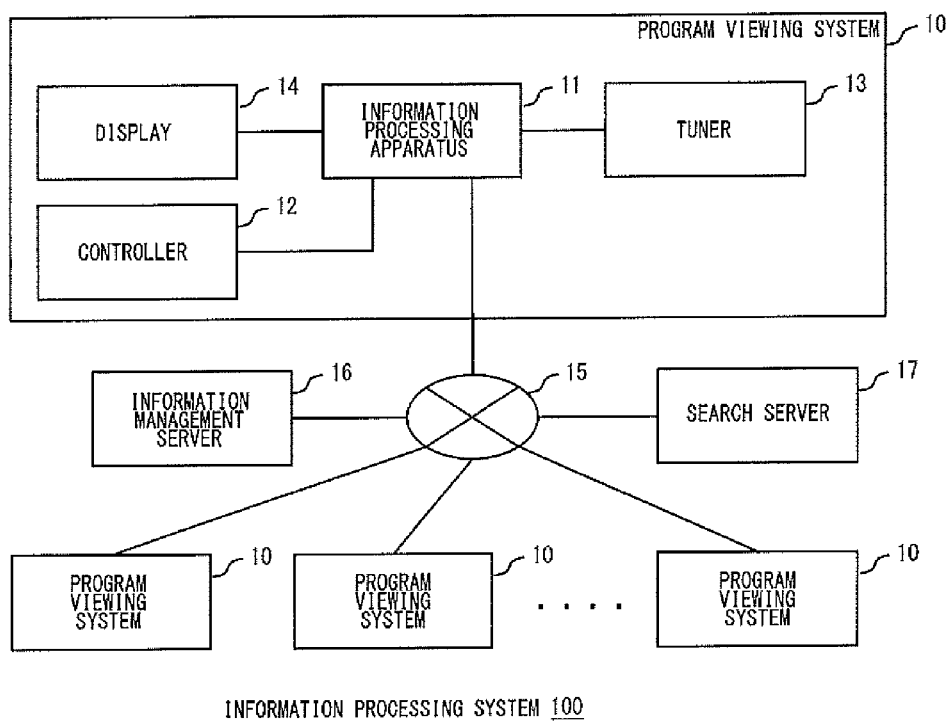
FIG. 1 shows the configuration of an information processing system according to an embodiment of the present invention.

FIG. 1 shows the configuration of an information processing system according to an embodiment of the present invention. An information processing system 100 is configured such that a plurality of program viewing systems 10, an information management server 16, and a search server 17 are connected via the Internet 15.

The program viewing system 10 allows viewing, recording, reproducing of terrestrial television broadcast, and displaying of a program guide. The system 10 comprises an information processing apparatus 11, a controller 12, a tuner 13, and a display 14. In this embodiment, the program viewing system 10 represents a unit of "viewers". Therefore, two or more people watching the display 14 may be dealt with as one viewer.

The tuner 13 is a terrestrial television tuner. The tuner 13 receives a broadcast signal on a channel selected by the viewer and decodes the broadcast signal into image information. The tuner 13 then sends the image information to the information processing apparatus 11. The tuner 13 also acquires EPG information (program information) from the broadcast signal and sends the information to the information processing apparatus 11. The tuner 13 and the information processing apparatus 11 may be connected by a universal serial bus (USB) cable.

Figure 2:
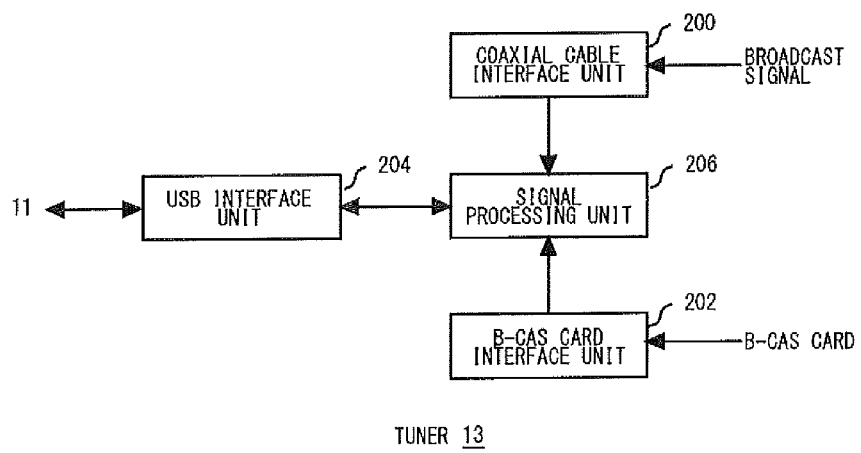
FIG. 2 is a block diagram showing the functional configuration of the tuner of FIG. 1.

FIG. 2 is a block diagram showing the functional configuration of the tuner 13 of FIG. 1. The blocks shown in the block diagram are implemented by hardware, i.e., components and mechanical devices, such as CPU or memory of a computer, or by software such as a computer program. FIG. 2 depicts functional blocks implemented by the cooperation of hardware and software. Therefore, it will be obvious to those skilled in the art that the functional blocks may be implemented in a variety of manners by a combination of hardware and software.

The tuner 13 comprises a coaxial cable interface unit 200, a B-CAS (registered trademark) card interface unit 202, a USB interface unit 204, and a signal processing unit 206. The coaxial cable interface 200 functions as an interface with a coaxial cable connected to the antenna and acquires a broadcast signal of terrestrial television broadcast. The B-CAS card interface unit 202 functions as an interface with a B-CAS card and acquires an encryption key for decoding the broadcast signal from the B-CAS card.

The USB interface unit 204 functions as an interface with a USB cable and acquires identification information of the channel selected by the viewer from the information processing apparatus 11. Further, the unit 204 sends image information on the selected channel and EPG information to the information processing apparatus 11. The signal processing unit 206 retrieves a signal on the channel selected by the viewer from the broadcast signal and decodes the signal into image information according to the encryption key of the B-CAS card.

Referring back to FIG. 1, the information processing apparatus 11 is a computer terminal connected to the Internet 15 that acknowledges the viewer's operation via the controller 12 and is operated accordingly. The information processing apparatus 11 may be a desktop game device. A program viewer application (hereinafter, also referred to as "program viewer AP"), for displaying and recording live transmission of a program broadcast on terrestrial digital television and for playing back recorded images, is installed in the information processing apparatus 11. Also installed in the apparatus 11 is a web browser for interpreting data for a structure document described in HTML, XML, etc. and displaying the result.

When the program viewer AP is started in the information processing apparatus 11, the information processing apparatus 11 may, for example, acquire image information on the channel selected by the viewer from the tuner 13 and display the program image on the display 14. The apparatus 11 may also acquire EPG information from the tuner 13 and display an electronic program guide on the display 14. The detailed configuration of the information processing apparatus 11 will be described later. The information processing apparatus 11 and the display 14 may be connected by a high-definition multimedia interface (HDMI: registered trademark) cable.

The information management server 16 manages the status of viewing programs acquired from the plurality of program viewing systems 10 and delivers the viewing status to each of the program viewing systems 10. The detailed configuration of the information management server 16 will be described later. The search server 17 provides a search service and supplies the source originating a search request with information indicating a web page with a high score of matching with the search key designated in the search request.

Figures 3, 4:
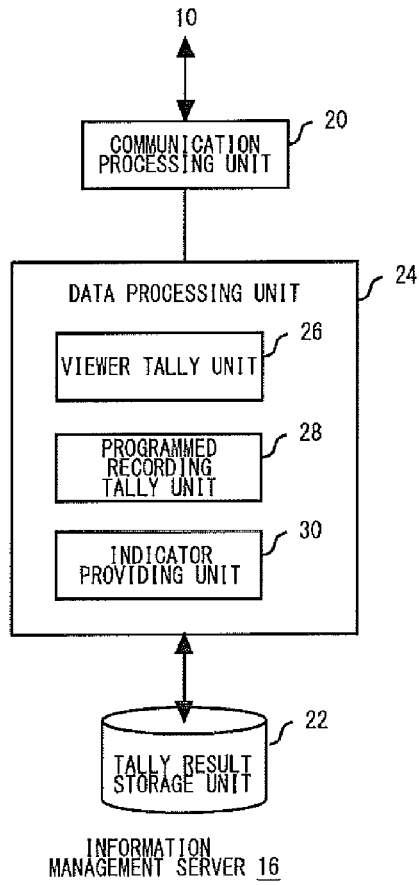
FIG. 3 is a block diagram showing the functional configuration of the information management server of FIG. 1.
FIG. 4 shows the structure of data stored in the tally result storage unit.

FIG. 3 is a block diagram showing the functional configuration of the information management server 16 of FIG. 1. It will be appreciated to a skilled person that the functional blocks of FIG. 3, like those of FIG. 2, may be implemented in a variety of manners by a combination of hardware and software. For example, the functional blocks of FIG. 3 may be stored in a predetermined recording medium as computer programs. The programs may be installed in a hard disk of the information management server 16, read into a main memory of the information management server 16, and run by a processor.

The information management server 16 comprises a communication processing unit 20, a tally result storage unit 22, and a data processing unit 24 for performing various data processes. The data processing unit 24 may include a viewer tally unit 26, a programmed recording tally unit 28, and an indicator providing unit 30.

The communication processing unit 20 performs a process of communicating with an external device via the Internet 15. The data processing unit 24 exchanges data with the information processing apparatus 11 in the program viewing system 10 via the communication processing unit 20. The tally result storage unit 22 is a storage area for storing data indicating the tally score in the viewer tally unit 26 and the programmed recording tally unit 28 described later.

FIG. 4 shows the structure of data stored in the tally result storage unit 22. A program ID field is adapted to contain a program ID uniquely identifying a program broadcast on a specific date and time. Programs broadcast on a periodical basis with the same program title are assigned different ID's if broadcast on different time and date. It is assumed that the program ID is defined in the EPG information. A viewer count field is adapted to contain the total number of viewers currently viewing the program identified by the program ID. In this embodiment, the viewers are categorized according to the age group and sex. Each subfield is adapted to contain the total number in the respective category. A programmed recording count field is adapted to contain the total number of viewers having programmed the recording of the program identified by the program ID, categorizing the viewers according to the age group and sex.

Referring back to FIG. 3, the viewer tally unit 26 acquires the program ID of the program currently viewed by the viewer from each of the plurality of information processing apparatuses 11 on a periodical basis and adds up the number of viewers viewing each program. In this embodiment, viewer attributes (i.e., age group and sex) are acquired along with the program ID. The number of viewers viewing the program identified by the program ID is added up for each viewer attribute so that the resultant score is stored in the tally result storage unit 22.

The programmed recording tally unit 28 acquires the program ID of the program that the viewer has programmed to record from each of the plurality of information processing apparatuses 11 on a periodical basis and adds up the number of recordings programmed. In this embodiment, viewer attributes are acquired along with the program ID. The number of recordings programmed for the program identified by the program ID is added up for each viewer attribute so that the resultant score is stored in the tally result storage unit 22.

The indicator providing unit 30 supplies the information processing apparatus 11 with an indicator indicating the status of viewing programs in the information processing system 100. The indicator includes an indicator indicative of the number of viewers viewing a program (hereinafter, live indicator) and an indicator indicative of the number of viewers that have programmed recordings of the program (hereinafter, programmed recording indicator).

More specifically, the indicator providing unit 30 transmits, as a live indicator, the number of viewers, categorized according to the age group and sex, stored in the tally result storage unit 22 to the information processing apparatus 11. The unit 30 also transmits the number of recordings programmed, categorized according to the age group and sex, stored in the tally result storage unit 22 to the information processing apparatus 11.

In one variation, the unit 30 may supply, as a live indicator, the result of entering the number of viewers in a predetermined evaluation function instead of the number of viewers itself. For example, the number of viewers of a given program relative to the total number of viewers, i.e. the viewing rate, may be supplied. The same is true of the programmed recording indicator. For example, the number of programmed recordings of a given program relative to the total number of viewers, i.e., the programmed recording rate, may be supplied as a programmed recording indicator.

Figure 5:
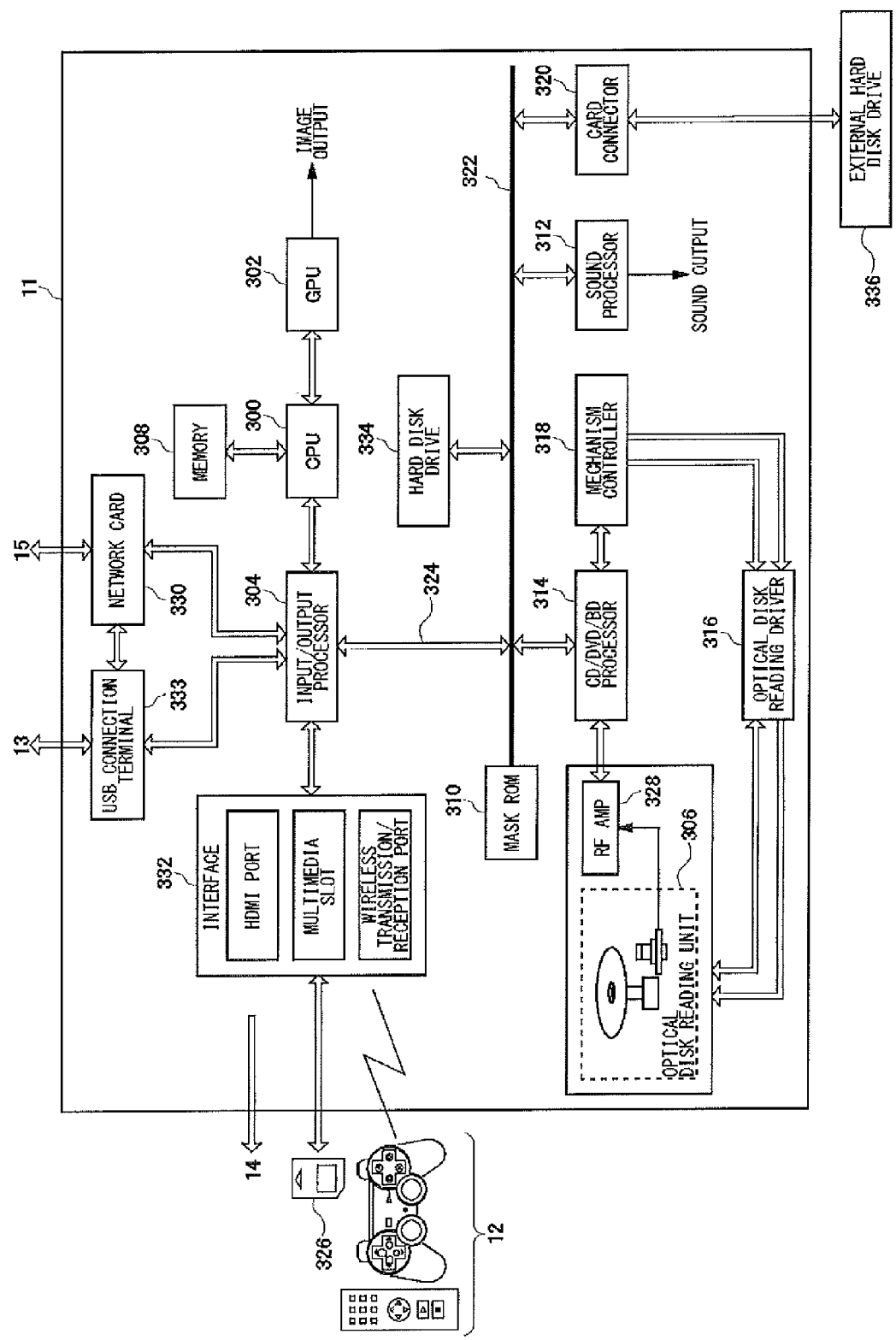
FIG. 5 shows the hardware configuration of the information processing apparatus of FIG. 1.

FIG. 5 shows the hardware configuration of the information processing apparatus 11 of FIG. 1. The information processing apparatus 11 comprises, as basic components, a CPU 300, a graphic processor unit (GPU) 302, an input and output processor 304, an optical disk reading unit 306, a main memory 308, a mask ROM 310, and a sound processor 312.

The CPU 300 controls signal processing and internal components based on various programs such as a game, an e-mail program, and an application for a web browser. The CPU 300 may be a multicore CPU such as a CELL. Alternatively, the CPU 300 may be a heterogeneous multicore CPU in which a plurality of heterogeneous processor cores are combined.

The CPU 302 performs image processing. The input and output processor 304 performs a process for interfacing between an external device and internal components, or a process for maintaining downward compatibility. The optical disk reading unit 306 reads from an optical disk such as a BD, DVD, and CD in which an application program or multimedia data is recorded. The main memory 306 functions as a buffer that temporarily stores data read from a work area of the CPU 300 or the optical disk. The mask ROM 310 primarily stores an operating system program run by the CPU 300 or the input and output processor 304. The sound processor 312 processes a sound signal.

The information processing apparatus 11 also comprises a CD/DVD/BD processor 314, an optical disk reading driver 316, a mechanism controller 318, a hard disk drive 334, and a card connector (e.g., a PC card slot) 320. The CD/DVD/BD processor 314 applies an error correction (e.g., cross interleave Reed-Solomon coding (CIRC)) process or an expanding and decoding process on a disk signal read by the optical disk reading unit 306 from a CD/DVD/BD and amplified by an RF amplifier 328. Thereby, the data recorded in the CD/DVD/BD is reproduced (restored). The optical disk reproducing driver 316 and the mechanical controller 318 control the rotation of the spindle motor of the optical disk reading unit 306, focusing/tracking of an optical pickup, and loading of a disk tray.

The hard disk drive 334 stores data saved from an application program or game read from the optical disk reading unit 306, or stores data such as photos, moving images, and music acquired via the input and output processor 304. The card connector 320 is a connection port for a communication card, an external hard disk drive 336, etc.

These components are primarily connected to each other via bus lines 322, 324, etc. The CPU 300 and the GPU 302 are connected via a dedicated bus. The CPU 300 and the input and output processor 304 are connected via SBUS. The input and output processor 304 is connected to the CD/DVD/BD processor 314, the mask ROM 310, the sound processor 312, the card connector 320, and the hard disk drive 334 via SSBUS.

The CPU 300 controls the overall operation of the information processing apparatus 11 by running the operating system program for the CPU stored in the mask ROM 310.

The CPU 300 reads various data from an optical disk such as CD, DVD, BD, etc. and loads the data into the main memory 308. The CPU 300 may also run various application programs downloaded via a communication network and control games, creation/editing of e-mail messages, or an operation like web page browsing.

The input and output processor 304 runs an operating system program for the input and output processor stored in the mask ROM 310 and thereby controls input and output. For example, the processor 304 controls the input and output of use-generated signals or game settings from the controller 12, contents or addresses of e-mail messages, or data from a memory card 326 adapted to store web site URLs, etc.

Further, the input and output processor 304 controls data input and output via a USB connection terminal 333, a network card 330, an IEEE1394 terminal or a PC card slot (not shown), etc. For example, the processor 304 may be connected to the tuner 13 via the USB connection terminal 333 or connected to the Internet 15 via the network card 330. The processor 304 may also perform data input and output through the memory card 326 via the PC card slot (not shown). Information from the controller 12 or the memory card is mediated by an interface 332 which includes a multimedia slot and a wireless transmission/reception port.

For example, the wireless transmission/reception port communicates with a game controller or a BD/DVD operation controller using wireless LAN or Bluetooth (registered trademark). The interface 332 is also provided with an interfere with an HDMI (registered trademark) cable and outputs image data to the display 14 via the interface.

The GPU 302 is provided with the function of a geometry transfer engine for processes like coordinate conversion and the function of a rendering processor. The GPU 302 renders an image in accordance with a rendering instruction from the CPU 300 and stores the rendered image in a frame buffer (not shown). For example, given that an application program stored in an optical disk uses three-dimensional (3D) graphics (e.g., a game program), the GPU 302 computes the coordinates of polygons forming three-dimensional objects by performing geometric computation. In the rendering process, the GPU 301 performs computation to generate an image obtained by capturing the three-dimensional object with a virtual camera, i.e., computation for perspective transformation (computation of coordinate values occurring when the vertices of polygons forming the three dimensional object are projected onto a virtual camera screen). The image data ultimately obtained is written in the frame buffer. The GPU 302 outputs a video signal corresponding to the image thus generated.

The sound processor 312 is provided with functions for adaptive differential pulse code modulation (ADPCM) decoding, audio signal reproduction, signal modulation, etc. The ADPCM decoding function is a function of reconstructing and outputting an audio signal for sound effects, etc. by reading waveform data stored in a sound buffer (not shown) built in the sound processor 312 or externally coupled to the processor 312. The signal modulation function also functions as a sampling sound source capable of generating an audio signal for musical sound, sound effects, etc. from the waveform data stored in the sound buffer.

When the information processing apparatus 11 having the configuration as described above is turned on, the operating system programs for the CPU 300 and for the input and output processor 304 are read from the mask ROM 310. The CPU 300 and the input and output processor 304 run the corresponding operating system programs. This allows the CPU 300 to control the components of the information processing apparatus 11 in a coordinated manner. The input and output processor 304 controls the input and output of signals from and to the controller 12, the memory card 326, etc.

Upon starting the operating system program, the CPU 300 performs an initialization process such as verification of the operation. The CPU 300 then controls the optical disk reading unit 306 to read an application program such as a game stored in the optical disk and load the program in the main memory 308, and then runs, for example, the game application program. When the game application program is run, the CPU 300 controls the GPU 302 and the sound processor 312 in accordance with a user instruction acknowledged from the controller 12 via the input and output processor 304, so as to control the display of images, and generation of sound effects or musical sound, etc.

For example, when a movie stored in the optical disk is played back, the CPU 300 controls the GPU 302 and the sound processor 312 in accordance with a user instruction (command) acknowledged from the controller via the input and output processor 304, so as to control the display of images, generation of sound effects or musical sound, etc in the movie played back from the optical disk.

FIG. 6 is a block diagram showing the functional configuration of the information processing apparatus 11 of FIG. 1. As in FIG. 2, it will be obvious to those skilled in the art that the functional blocks of FIG. 6 may be implemented in a variety of manners by a combination of hardware and software. For example, the functional blocks of FIG. 6 may be stored in a predetermined recording medium as computer programs. The programs may be installed in a hard disk drive 334 of FIG. 5, read into the main memory 308 of the information processing apparatus 11, and run by the CPU 300. In other words, it can be said that the functional blocks of FIG. 6 show various modules forming the program viewing AP.

The information processing apparatus 11 is provided with an external interface unit 40, a data storage unit 48, and a data processing unit 56. The external interface unit 40 provides an interface with various external devices. The data processing unit 56 exchanges data with an external device via the external interface unit 40. The external interface unit 40 includes a tuner IF unit 41, a communication processing unit 42, an operation detection unit 44, and a display data output unit 46.

The tuner IF unit 41 provides an interface with the tuner 13 and sends data acknowledged from the tuner 13 to the data processing unit 56. The communication processing unit 42 runs a process of communicating with the information management server 16 and the search server 17 via the Internet 15. The operation detection unit 44 detects a viewer operation of the controller 12 and sends the content of operation to the data processing unit 56. The display data output unit 46 sends the data for videos and images for display sent from a display processing unit 78 (described later) to the display 14 to display the videos and images accordingly.

The data storage unit 48 is a storage area for storing data and may be implemented as a hard disk drive and data stored therein. The data storage unit 48 includes a program information storage unit 50, a recording information storage unit 52, and a thumbnail storage unit 54.

The program information storage unit 50 stores program information on a plurality of programs that should be displayed in the electronic program guide. FIG. 7 shows the structure of data stored in the program information storage unit 50. A program summary field is adapted to contain summary information on the program. A popularity rank field is adapted to temporarily contain the relative popularity of each of a plurality of programs broadcast in the same time zone.

Referring back to FIG. 6, the recording information storage unit 52 stores recording information related to the recording of programs in the information processing apparatus 11. FIG. 8 shows the structure of data stored in the recording information storage unit 52. A recording ID field is adapted to contain a recording ID uniquely identifying the recorded content in the information processing apparatus 11.

A recording flag field of FIG. 6 is adapted to contain a flag indicating whether the recording process is completed or whether an error occurred during the recording process. For example, a record "done" in the recording flag field indicates that the recording is completed, and a record "not done" in the recording flag field indicates that the recording is programmed. A playback progress rate field is adapted to contain a value indicating the progress of playback of the recorded content, i.e., the percentage of the recorded content already played back. For example, the playback progress rate "0%" in a record indicates that the recorded content has not been played back at all. A content data field is adapted to contain data of the recorded content itself, i.e., data for the images of the program recorded.

Referring back to FIG. 6, the thumbnail storage unit 54 stores data for a thumbnail image showing a part of the image included in the recorded content on a reduced scale, associating the data with the recording ID of the recorded content. A thumbnail image may be a still image or a moving image.

A physical storage area for the data storage unit 48 to store the data may be the hard disk drive 334 built in the information processing apparatus 11, the external hard disk drive 336, or the memory card 326. The external hard disk drive 336 may store only the recorded information of a relatively large data size (particularly, the data in the content data field). The storage area for storing the respective data may be determined as needed according to the operation of the viewer.

The data processing unit 56 is a functional block for performing data processing and may be implemented as a module of a computer program. The data processing unit 56 includes a program image acquisition unit 58, a program information acquisition unit 60, an attribute acquisition unit 62, a recording processing unit 64, a playback processing unit 66, an indicator acquisition unit 68, a popularity determination unit 70, a thumbnail setting unit 72, a search key acquisition unit 74, a search execution unit 76, a display processing unit 78, and a viewing status communicating unit 99.

The program image acquisition unit 58 acquires image information of a program sent from the tuner 13. The program information acquisition unit 60 acquires EPG information sent from the tuner 13 and stores the program information of the programs in the program information storage unit 50.

The attribute acquisition unit 62 acquires attribute information of the viewer entered by the viewer, e.g., the age and sex of the viewer. For example, the unit 62 may acquire the attribute information from a predetermined storage area adapted to store the attribute information entered by the viewer in a setting screen of the information processing apparatus 11.

The recording processing unit 64 programs the recording of a program designated by the viewer and records the program accordingly. Moreover, the unit 64 updates the recording information in the recording information storage unit 52 as appropriate. For example, the recording flag is set to "not done" in the programmed recording process. In the recording process, the image data for the program to be recorded is successively recorded in the content data field. When the recording process is completed normally, the recording flag is set to "done". When an error occurs in the recording process, the recording flag is set to "error".

When the target program being recorded is ranked at or higher than a certain rank in the ranking of popularity as determined by the popularity determination unit 70 described later, e.g., when the program is ranked as the third most popular program or higher, the recording processing unit 64 indicates as such in the recorded content. In this embodiment, a chapter is inserted into the recorded content when the program is ranked at or higher than a certain rank in the ranking of popularity.

The playback processing unit 66 plays back the recorded content by sending the image data for the content designated by the viewer to the display processing unit 78. In association with this, the unit 66 updates the recording information in the recording information storage unit 52 as appropriate in accordance with the status of playback of the recorded content. For example, the rate unit 66 sets the rate of playback time relative to the recorded time in the playback progress rate field.

The playback processing unit 66 may play back only the popular scene in the program originating the recorded content, in accordance with an instruction from the viewer. For example, the unit 66 may play back only the portion preceding and succeeding the insertion of the chapter by the recording processing unit 64 for a predetermined period of time. Alternatively, changes in the ranking of popularity as determined by the popularity determination unit 70 described later may be stored in the data storage unit 481. The playback processing unit 66 may play back only the portion of the program originating the recorded content ranked at or higher than a certain rank in the ranking of popularity.

The indicator acquisition unit 68 acquires a live indicator and a programmed recording indicator from the information management server 16. Typically, the live indicator and the programmed recording indicator are acquired when the display processing unit 78 starts displaying an electronic program guide. The latest live indicator and the programmed recording indicator are acquired when an elapse of a predetermined interval period is detected.

The popularity determination unit 70 determines the ranking of relative popularity of a plurality of programs broadcast in the same time zone in accordance with the live indicator and/or the programmed recording indicator. In this embodiment, the larger the sum of the live indicator and the programmed recording indicator, the higher the program is ranked. Since the live indicator is not available for a program not broadcast yet, the ranking of popularity is determined only on the basis of the programmed recording indicator. After determining the ranking of popularity of programs, the popularity determination unit 70 updates the data in the popularity rank field forming the program information in the program information storage unit 50.

When the population in which the ranking of popularity should be determined is designated by the user, the popularity determination unit 70 determines the ranking of popularity in accordance with the live indicator and the programmed recording indicator associated with the designated attribute (in this case, age group and sex). When the population is not designated, the ranking of popularity is determined in accordance with the sum of live indicators across the attributes and the sum of programmed recording indicators across the attributes.

The popularity determination unit 70 may output the indicator itself acquired by the indicator acquisition unit 68 as data indicating the degree of popularity without determining the ranking popularity. In this case, the indicator itself is dealt with as the ranking of popularity.

Upon detecting that the recording process is completed in the recording processing unit 64, the thumbnail setting unit 72 refers to the recording information in the recording information storage unit 52 and sets a thumbnail image showing a moving image or still image stored as content data on a reduced scale. The unit 72 stores the data for the thumbnail image in the thumbnail storage unit 54, associating the data with the recording ID.

Of the plurality of images stored as content data, the thumbnail setting unit 72 according to the embodiment sets a thumbnail image from the image of a popular scene in the program originating the recorded content. For example, a thumbnail image may be created from an image immediately preceding or succeeding the insertion of a chapter by the recording processing unit 64. Alternatively, changes in the ranking of popularity as determined by the popularity determination unit 70 may be stored in the data storage unit 48 so that the thumbnail setting unit 72 may create a thumbnail image from the image occurring when the program originating the recorded content is ranked the highest.

The search key acquisition unit 74 acquires the ID of the program being displayed on the display 14 from a program image displaying unit 84 and acquires, as a search key, program information associated with the program ID from the program information storage unit 50. The program being displayed may be a program broadcast live or a recorded program. The program information used as a search key may be the program title or the name of a performer. Alternatively, the information may be a noun phrase extracted appropriately from a character string of the summary information by, for example, morphological analysis.

The search key may not be limited to a key word. The search key acquisition unit 74 may acquire data of another format (e.g., image data etc. included in the program information) as a search key. In other words, data of an arbitrary format permitted by the search server 17 may be acquired. Alternatively, the search key acquisition unit 74 may set a search key using a plurality of elements in the program information as AND conditions. Still alternatively, the unit 74 may send the respective elements as search keys to the search execution unit 76 or causes the unit 76 to perform a plurality of search processes successively. Still alternatively, when the program information of the program being displayed is updated, the unit 74 may acquire a new search key from the program information as updated and causes the search execution unit 76 to perform a new search.

The search execution unit 76 transmits a search request designating the search key acquired by the search key acquisition unit 74 to the search server 17. The unit 76 acquires, as a search result, a combination of the matching score with the search key and an URL of a web page. The search execution unit 76 acquires the data for the web page determined by the search server 17 to have the highest matching score with the search key, based on the URL. The unit 76 then sends the data for the web page to the display processing unit 78.

The display processing unit 78 causes the display 14 to display an image desired by the viewer by sending the data for a moving image or still image that should be displayed on the display 14 to the data output unit 46. The display processing unit 78 includes a portal screen displaying unit 80, a standby screen displaying unit 82, a program image displaying unit 84, a search result displaying unit 86, a program guide displaying unit 88, and a video control screen displaying unit 96.

The portal screen displaying unit 80 displays a portal screen that serves as a primary source of transition a plurality of types of viewing screens or control screens. The portal screen is a top, frontend screen displayed without exception when any of a plurality of types of viewing screens or control screens is displayed. The portal screen serves as a common entrance to these screens. The plurality of types of viewing screens and control screens include a television screen for viewing the image from a program (hereinafter, also simply referred to as "live image") currently broadcast on terrestrial digital television, a video screen for playing back a recorded program, and a setting screen for entering various settings for the program viewing AP.

FIG. 9 shows an exemplary portal screen as displayed. On-screen selection icons 102 are for selecting from a plurality of types of viewing screens or control screens provided by the program viewing AP. The icons 102 include a TV icon 102a, . . . , and a setting icon 102h. When the TV icon 102a is selected, transition is made to a TV screen. When a program icon 102b is selected, transition is made to an EPG screen displaying an electronic program guide. When a ranking icon 102c is selected, transition is made to a ranking screen displaying a ranking of programs in popularity.

When a schedule icon 102d is selected, transition is made to a schedule screen for viewing a schedule (e.g., programmed recording). When a video screen icon 102e is selected, transition is made to a video screen. When a program search icon 102f is selected, transition is made to a program search screen for searching for a program being broadcast or scheduled to be broadcast. When a manual icon 102g is selected, transition is made to a manual screen displaying a manual related to the operation of the program viewing AP. When a setting icon 102h is selected, transition is made to a setting screen.

A latest information pop 104 represents a pop-up display of the latest information corresponding to the type of on-screen selection icon 102 that is selectable. Referring to FIG. 9, the TV icon 102a is being made selectable. The latest information pop 104, indicating the status of viewing by other viewers of the program currently broadcast, is displayed in association with the TV icon 102a. For example, the portal screen displaying unit 80 may display in the latest information pop 104 the title of the program ranked No. 1 by the popularity determination unit 70 among the programs current broadcast.

By way of another example, the portal screen displaying unit 80 may display in the latest information pop 104, which is displayed in association with the schedule icon 102d, the number of currently programmed recordings or the title of the program programmed to be recorded. The unit 80 may display a currently available hard disk space or time available for recording in the latest information pop 104 displayed in association with the video icon 102e.

A status tag 106 indicates the viewing status of the recorded content (in other words, the viewing status based on the video-related operation). The tag 106 includes an error situation tag 106a, a unviewed tag 106b, a programmed recording tag 106c. In the event of an error during a recording process in the recording processing unit 64, the portal screen displaying unit 80 displays the situation in the error situation tag 106a. The unit 80 also refers to the recording information stored in the recording information storage unit 52 and displays the number of recorded contents that are recorded and not played back yet (0% playback progress rate) in the unviewed tag 106b. The unit 80 also refers to the recording information and displays the number of programmed recordings not yet processed in the programmed recording tag 106c.

A recorded content thumbnail 108 is a thumbnail image of each recorded content. One thumbnail image is displayed per one recorded content. The portal screen displaying unit 80 acquires a thumbnail image of the recorded content that should be displayed from the thumbnail storage unit 54 and sets the image in the portal screen. Recorded content thumbnails 108 for the entirety of the recorded contents may be displayed. Alternatively, thumbnail images of only those recorded contents with 100% playback progress rate may be displayed, or thumbnail images of only those recorded contents with 0% playback progress rate may be displayed.

Referring back to FIG. 6, the standby screen displaying unit 82 displays a standby screen. The standby screen is a screen displayed when a viewer operation is not detected for a predetermined period of time (e.g., 30 seconds) or more in the portal screen. The standby screen could be equated with a screen saver. When a user operation using the controller 12 is detected while the standby screen is being displayed, the standby screen displaying unit 82 terminates the display of the standby screen so that the portal screen displaying unit 80 displays the portal screen again.

Figure 10:
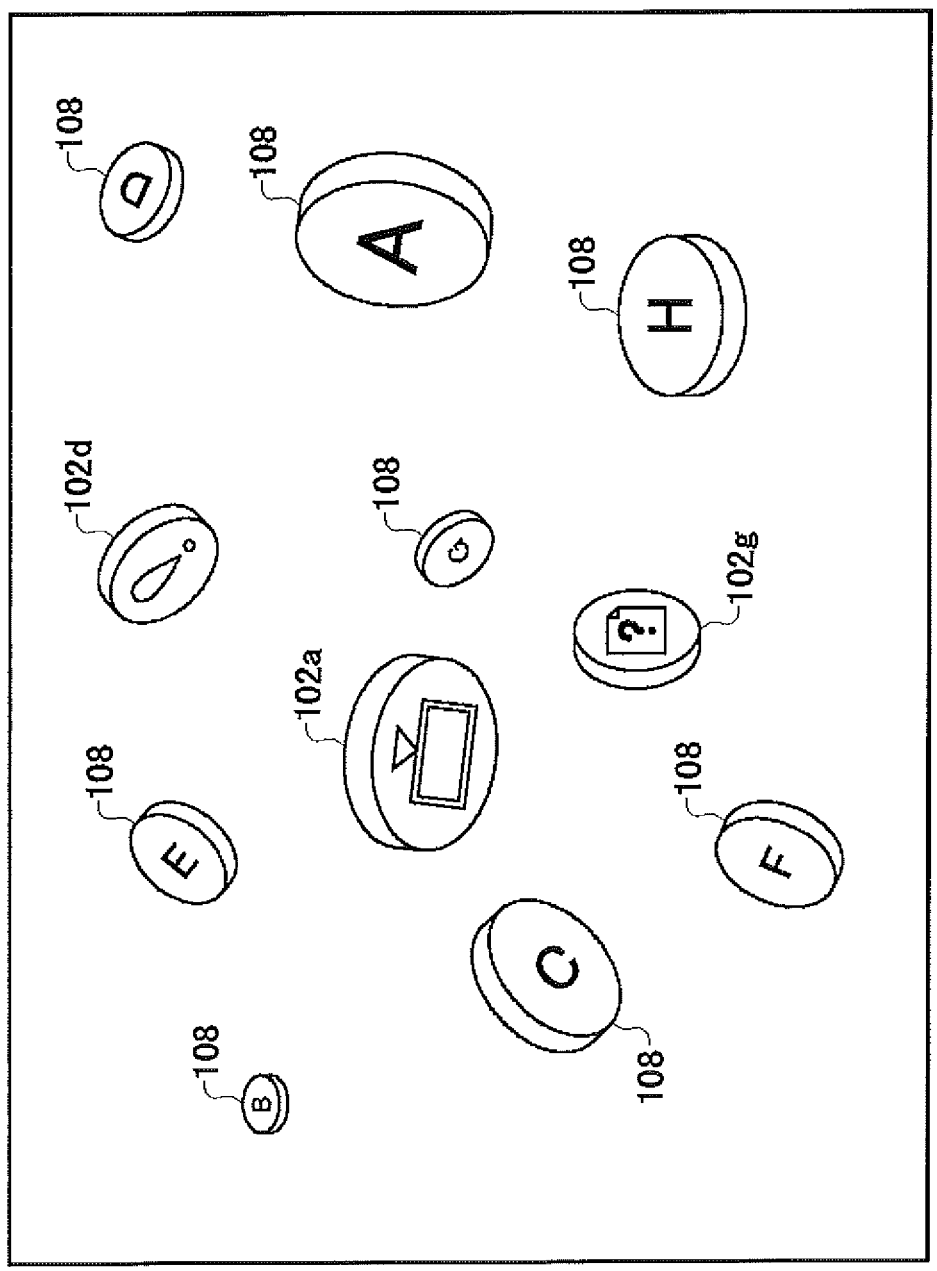
FIG. 10 shows an exemplary standby screen as displayed.

FIG. 10 shows an exemplary standby screen as displayed. In the standby screen, the standby screen displaying unit 82 displays an image of a three-dimensional space in which each of the on-screen selection icons 102 and the recorded content thumbnails 108 is displayed in varying manner, changing its position, angle, and size.

The standby screen displaying unit 82 refers to the recording information in the recording information storage unit 52 so as to change the mode of display of the recorded content thumbnail 108 corresponding to the recorded content in accordance with the attribute of the recorded content. For example, the recorded content with the recording date and time closer to the current date and time may be indicated by a recorded content thumbnail 108 displayed in a varying mode assumed to attract more attention of the viewer. More specifically, the target recorded content thumbnail 108 may be displayed on a scale larger than the other recorded content thumbnails 108. Alternatively, the target recorded content thumbnail 108 may be allowed to change its mode of display more rapidly than the other recorded content thumbnails 108.

Referring back to FIG. 6, the program image displaying unit 84 displays the image of the program on the display 14. For example, when the TV icon 102a is selected in the portal screen, the unit 84 displays the live image of the program acquired by the program image acquisition unit 58. When the video icon 102e is selected in the portal screen and playback of the recorded content is requested in the video screen at the destination of transition, the unit 84 displays the image of the recorded content acknowledged from the playback processing unit 66.

Figure 11:
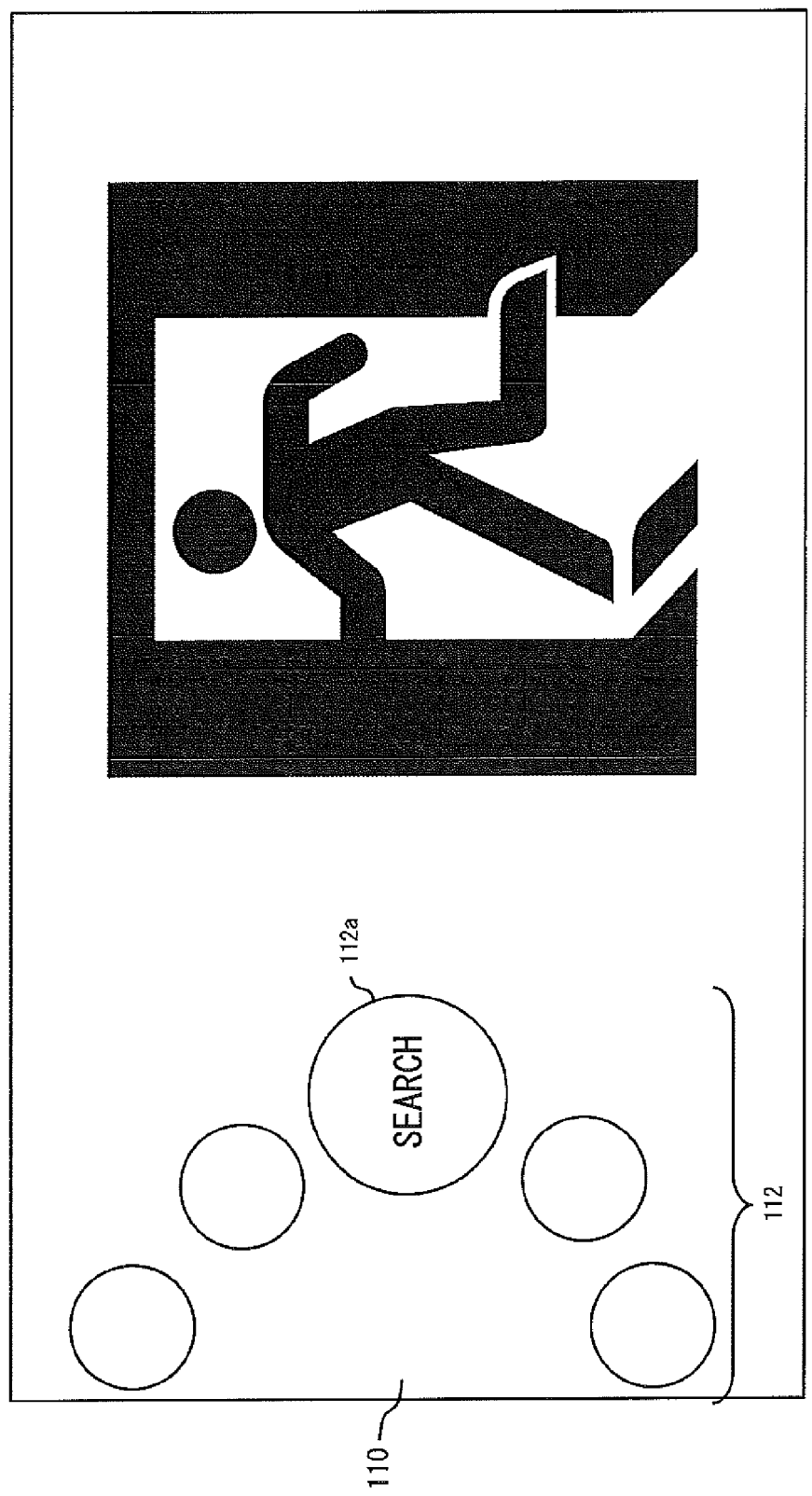
FIG. 11 shows an exemplary image display screen.

The program image displaying unit 84 displays a control icon for acknowledging a viewer operation in the television screen or the video screen (hereinafter, generically referred to as "image display screen") displaying the image of a program. FIG. 11 shows an exemplary image display screen 110. Control icons 112 in the figure include a search icon 112a for initiating an Internet search using information related to the program as a key. Selection of the search icon 112a represents a trigger for starting a process in the search key acquisition unit 74 and the search execution unit 76.

Referring back to FIG. 6, the search result displaying unit 86 displays on a browser screen data for the web page acknowledged from the search execution unit 76 as a search result. The browser screen is a screen in which the web browser is running.

Figure 12:
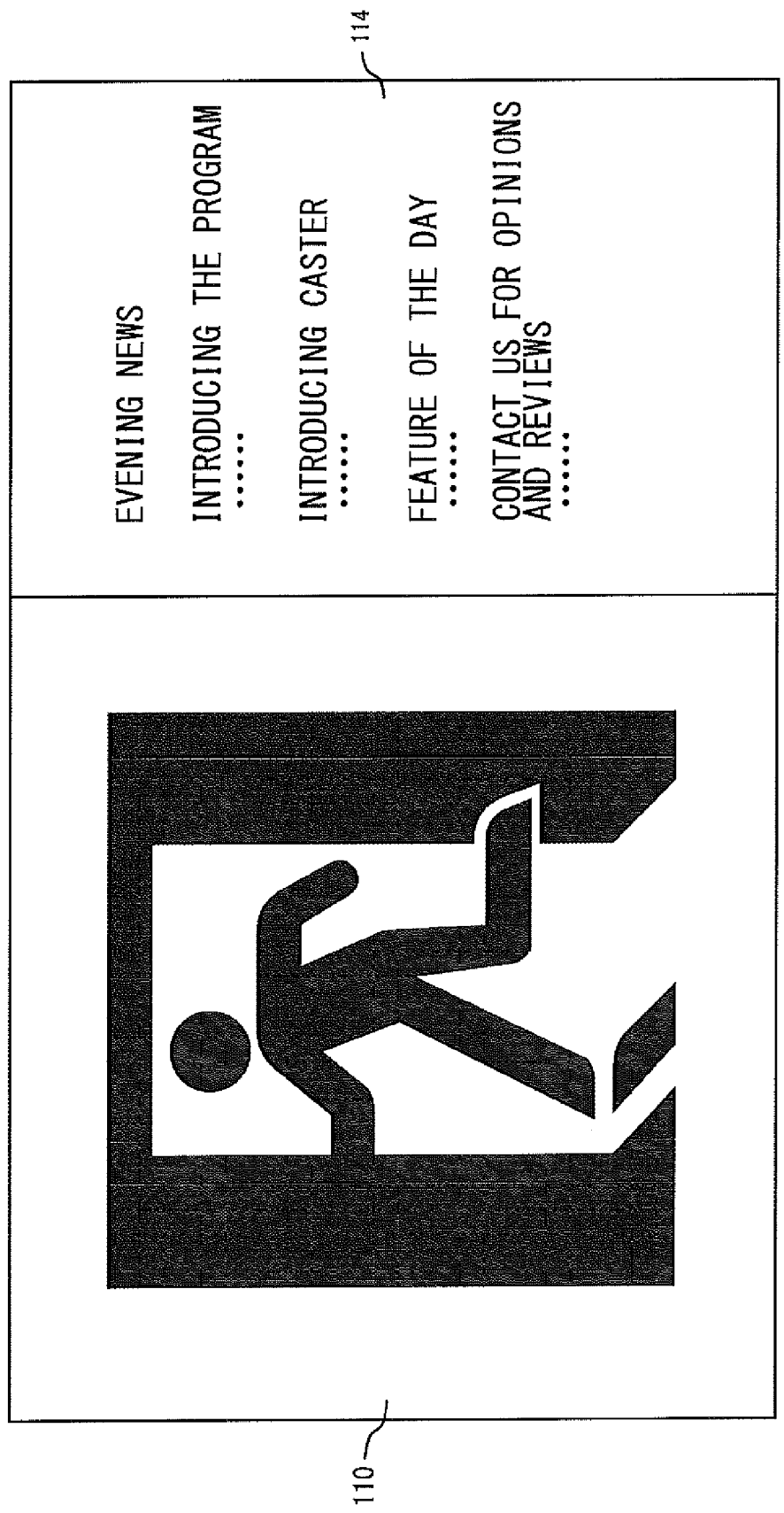
FIG. 12 shows an exemplary image display screen.

FIG. 12 shows an exemplary image display screen 110. As shown in the figure, the image display screen 110, and a browser screen 114 displaying the search result using the information on the program being displayed in the image display screen 110 as a key are displayed on the display 14 at the same time. Referring to the figure, the program home page is displayed in the browser screen 114. When the search execution unit 86 performs a new search, the search result displaying unit 86 updates the displayed content in the browser screen 114, displaying the result of the new search in the browser screen 114.

Referring back to FIG. 6, the program guide displaying unit 88 performs a process of displaying an electronic program guide. The program guide displaying unit 88 includes a cursor displaying unit 90, a first program guide displaying unit 92, and a second program guide displaying unit 94. The cursor displaying unit 90 displays a cursor that allows the viewer to select a specific program in the electronic program guide and moves the cursor in accordance with the viewer operation. The viewer selects an area in which information on a program is displayed (hereinafter, also referred to as "program frame") in the electronic program guide, by using the controller 12 to move the cursor. The program frame can be said to be a cell area formed by a time axis and a channel axis.

When a predetermined viewer operation is acknowledged while a program is being displayed by the program image displaying unit 84, the first program guide display unit 92 refers to the program information in the program information storage unit 50 and displays the first program guide, superimposing the guide on the program image. The first program guide includes an arrangement of program information on a plurality of programs currently broadcast in the respective channels. The first program guide displaying unit 92 displays the first program guide, setting a transparency rate so that the program image in the background is viewable to the viewer.

In this embodiment, the first program guide displaying unit 92 displays the first program guide in which only the information on the currently broadcast programs is arranged. When a program displayed in a program frame ends, the first program guide displaying unit 92 displays information on a subsequently broadcast program in the program frame.

Figure 13:
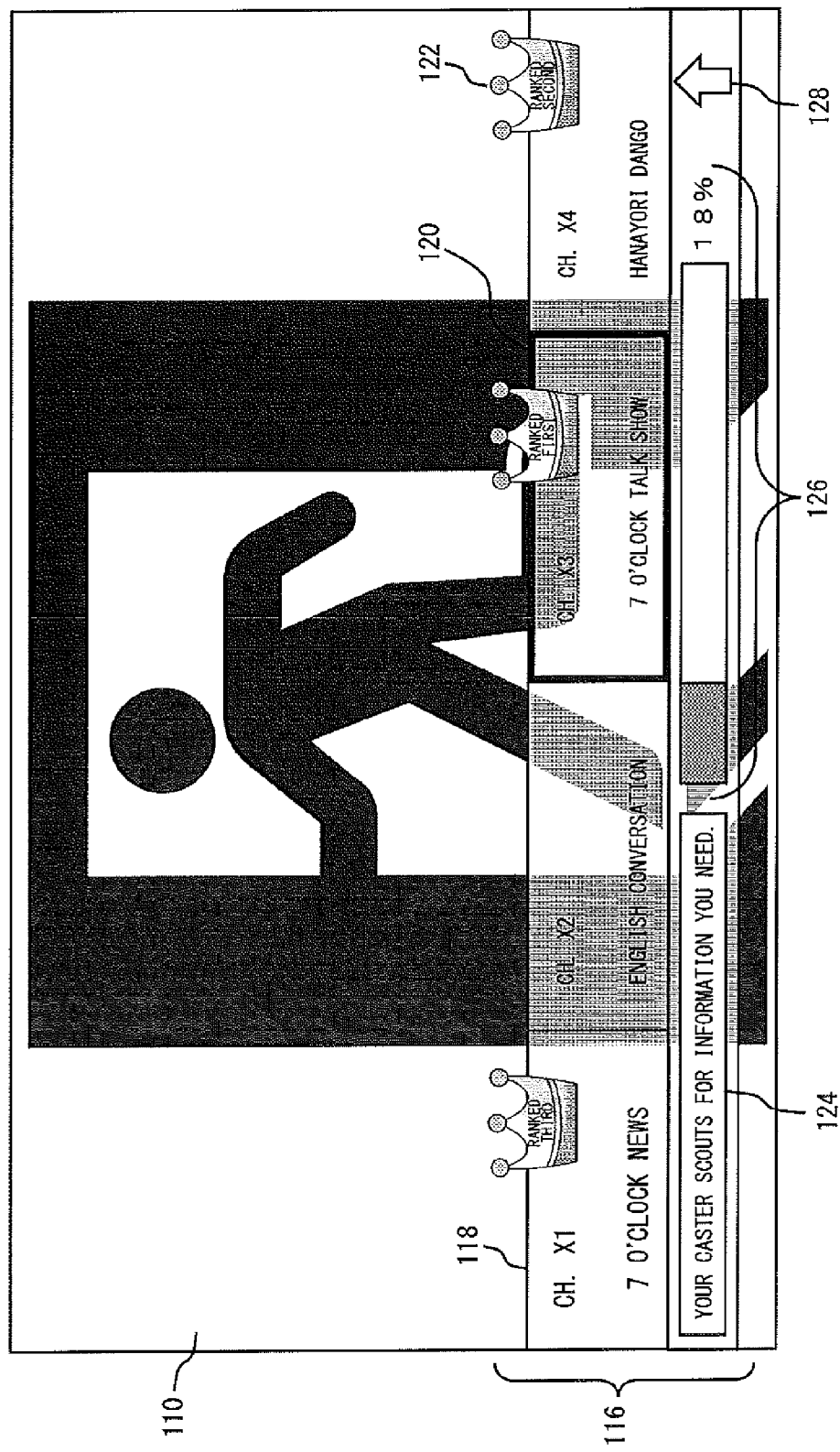
FIG. 13 shows an exemplary first program guide as displayed.

FIG. 13 shows an exemplary first program guide 116 as displayed. The first program guide 116 shows program frames 118 corresponding to a plurality of channels. The channel name and the program title are displayed in each program frame 118. The first program guide displaying unit 92 refers to the program information on the programs and displays objects indicating the rank of popularity (hereinafter, also referred to as "popularity rank indicator") in the program frames 118 for the top-ranking three programs, associating the objects with the programs. In one variation, the rank of popularity of each program may be suggested to the viewer by varying the color in the program frame 118, the character font of the program information, or the like. The first program guide displaying unit 92 refers to the program information of the respective programs periodically (e.g., once in one minute) and updates the popularity rank indicators accordingly.

The cursor displaying unit 90 displays a cursor 120 for selecting the program frame 118. The viewer uses the cursor 112 to select the program frame 118 for the program for which the viewer wishes to view the program content or the progress status. The first program guide displaying unit 92 acquires a program summary of the program corresponding to the program frame 118 selected by the cursor 120 (hereinafter, also referred to as "temporarily selected program") from the program information storage unit 50 and displays the summary in the program summary field 124, allowing the scrolling of the display. When the cursor 120 is moved downward in a given program frame 118, the first program guide displaying unit 92 may display information on the program broadcast after the currently broadcast program in the program frame 118.

The first program guide displaying unit 92 computes the degree of progress of the program, based on the broadcast start time, the broadcast end time, and the current time of the temporarily selected program and displays the degree in a progress indicator 126. In one variation, the unit 92 may indicate the degree of progress of each program to the viewer by varying the mode of display in the plurality of program frames 118 displayed in the first program guide 116 in accordance with the degree of progress of the programs.

Further, the first program guide displaying unit 92 displays a popularity transition indicator 128 of the temporarily selected program. When the latest popularity rank of the temporarily selected program is acquired, the first program guide displaying unit 92 sets a popularity transition indicator 128 to show the status of transition as compared with the past popularity rank (e.g., rise, decline, no change).

When a predetermined viewer operation (e.g., depression of a designated button in the controller 12) is initiated by the viewer for the temporarily selected program in the first program guide 116, the data processing unit 56 acknowledges that the temporarily selected program is designated as a formally selected program. This causes the program image displaying unit 84 to switch the program image displayed in the image display screen 110 to the image of the formally selected program. For example, the program image acquisition unit 58 acquires the image information on the formally selected program from the tuner 13, and the program image displaying unit 84 displays the program image of the formally selected program on the display 14.

The first program guide displaying unit 92 may further display the live indicator and/or the programmed recording indicator providing the ground for the current popularity rank, associating the indicator with the program for which the popularity rank indicator is displayed or the temporarily selected program (not shown in FIG. 13). According to this embodiment the viewer can view the data itself that indicates the actual status of viewing, in addition to the popularity rank, which is an abstraction of the viewing status of the program.

Referring back to FIG. 6, the second program guide displaying unit 94 displays the second program guide in the entirety of the screen of the display 14, when the program guide icon 102*b* is selected in the portal screen. The second program guide shows an arrangement of program information on a plurality of programs, using the time axis covering a plurality of time zones as a vertical axis and using the channel axis covering a plurality of channels as a horizontal axis.

FIG. 14 shows an exemplary second program guide as displayed. The figure shows the second program guide showing program information covering 24 hours. A channel indicator 130 is an identifier object for identifying a channel on terrestrial digital television. A channel interval 131 is arranged between adjacent channels. The mode of displaying a program frame may be changed for each time zone (e.g., each three hours) so that the viewer can have knowledge of programs broadcast in the same time zone. For example, the color or character font of the program frame may be changed.

The second program guide displaying unit 94 enlarges or reduces the area for the program frame in the second program guide in accordance with a viewer operation. More specifically, the unit 94 enlarges or reduces the size of the program frame per unit time or enlarges or reduces the size of the program frame per channel. Associated with this, the volume of program information that can be displayed in each program frame is increased or decreased. For example, the mode of displaying the second program guide may be switched such that "vertical axis=24 hrs, horizontal axis=9 channels", "vertical axis=5 hrs, horizontal axis=7 channels", "vertical axis=3 hrs, horizontal axis=5 channels", or "vertical axis=2 hrs, horizontal axis=3 channels".

The second program guide displaying unit 94 displays "the program title of the program started to be broadcast" on the first line of the program frame in the second program guide, and displays the program summary in the second and subsequent lines. In the second program guide where "vertical axis=24 hrs, horizontal axis=9 channels", the program frame for a 30-minute program is displayed so as to consume a minimum unit of display, i.e., a single line. Thus, the program information for a program that lasts less than 30 minutes is displayed in a balloon in accordance with the movement of a cursor 132 described later.

The cursor displaying unit 90 displays a cursor 132 for selecting a program frame. The viewer uses the cursor 132 to select the program frame of a program for which the viewer wishes to know more detailed information or a program that the viewer desires to control for viewing. The program highlighted by the cursor 132 is designated as a temporarily selected program. The second program guide displaying unit 94 enlarges the program frame of the temporarily selected program in the direction of channel axis, i.e., displays the frame in a larger size than the other program frames. Further, the second program guide displaying unit 94 displays the program summary of the temporarily selected program in a program summary field 134, allowing the scrolling of the display.

Figure 15:
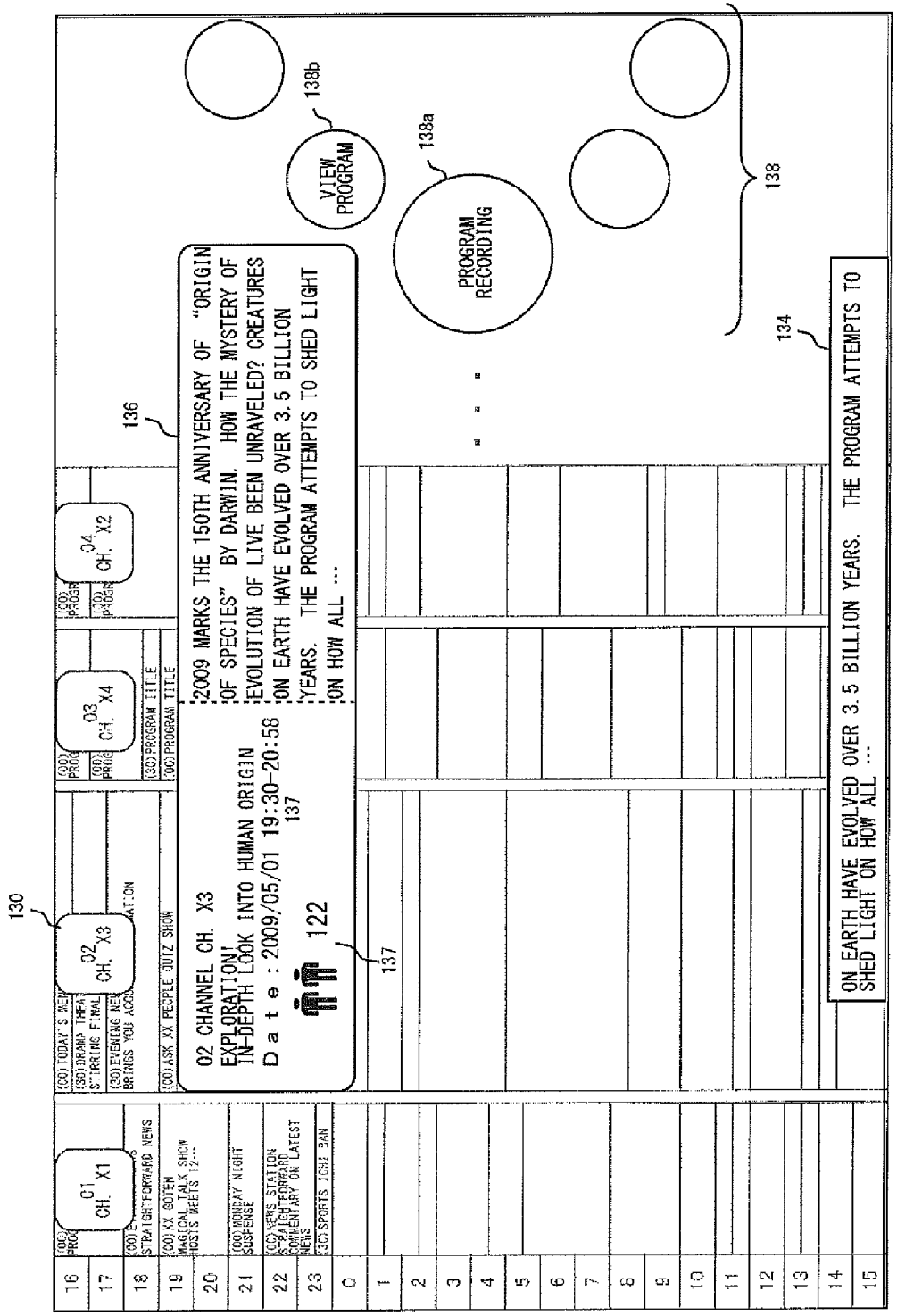
FIG. 15 shows an exemplary second program guide as displayed.

FIG. 15 also shows an exemplary second program guide as displayed. The figure shows that the temporarily selected program of FIG. 14 is designated as the formally selected program by a predetermined user operation. The viewer performs a desired operation for viewing the formally selected program by selecting control icons 138 such as a programmed recording icon 138*a* or a program viewing icon 138*b*.

The second program guide displaying unit 94 displays program information on the formally selected program (e.g., channel name, broadcasting station name, program title, broadcast date and time, viewing status, program summary) in a program detail window 136. The viewing status indicator 137 shows the number of viewers of the formally selected program. More specifically, the live indicator, the programmed recording indicator, or a total thereof may be displayed. When the formally selected program is designated, the second program guide displaying unit 94 displays the program detail window 136, superimposing the window 136 on the second program guide in a pop-up mode of display and displaying the second program guide in the background in a reduced image quality. For example, the second program guide may be displayed in a blurred manner by removing high-frequency components from the image data for the second program guide. Alternatively, a semitransparent object may be displayed on the image of the second program guide.

A description will now be given of a variation adapted for a case where the display 14 is a 3D display capable of stereographic display. The image of the program frame of the program selected by the cursor 132, i.e., the temporarily selected program, and/or the image of the program detail window 136, as displayed by the second program guide displaying unit 94 may be a parallax view split temporarily or spatially.

For example, when the viewer wears eyeglasses with a shutter, a temporarily split parallax view may be displayed, and, when the viewer wears eyeglasses with a polarization plate, a spatially split parallax view may be displayed. Typically, the program frame of the temporarily selected program and/or the program detail window 136 is displayed in front of the second program guide.

According to this variation, viewability of the program frame of the temporarily selected program and/or the program detail window 136 is increased. Whether a parallax view is displayed or the mode of parallax view may be preset by the viewer. Alternatively, the information processing apparatus 11 may detect the type of the display 14 and determine dynamically in accordance with the type.

Figure 16:
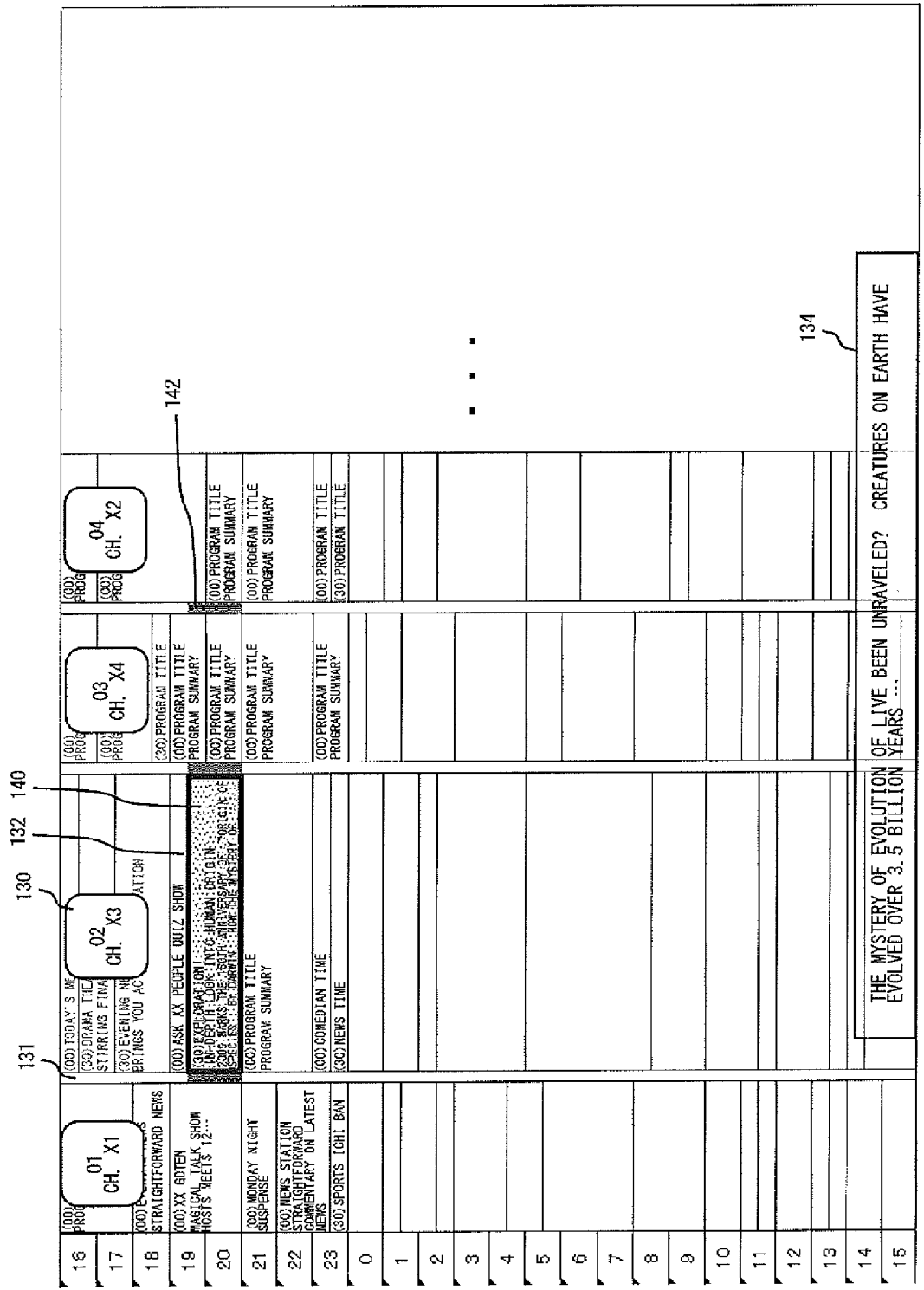
FIG. 16 shows an exemplary second program guide as displayed.

FIG. 16 also shows an exemplary second program guide as displayed. The figure shows the second program guide displayed after the recording of the formally selected program is programmed in FIG. 15. The second program guide displaying unit 94 displays a program frame 140 of the program programmed to be recorded in a predetermined mode indicating that the recording of the program has been programmed. Associated with this, a programmed recording line 142 is displayed in the channel interval 131 of the time zone in which the recording of the program is programmed so as to indicate that the program is programmed to be recorded in the time zone. The second program guide displaying unit 94 may display a line object indicating a current time in the second program guide in a similar mode as the programmed recording line 142. The provision is particularly useful when the information on the program broadcast already continues to be displayed in the second program guide.

Figure 17:
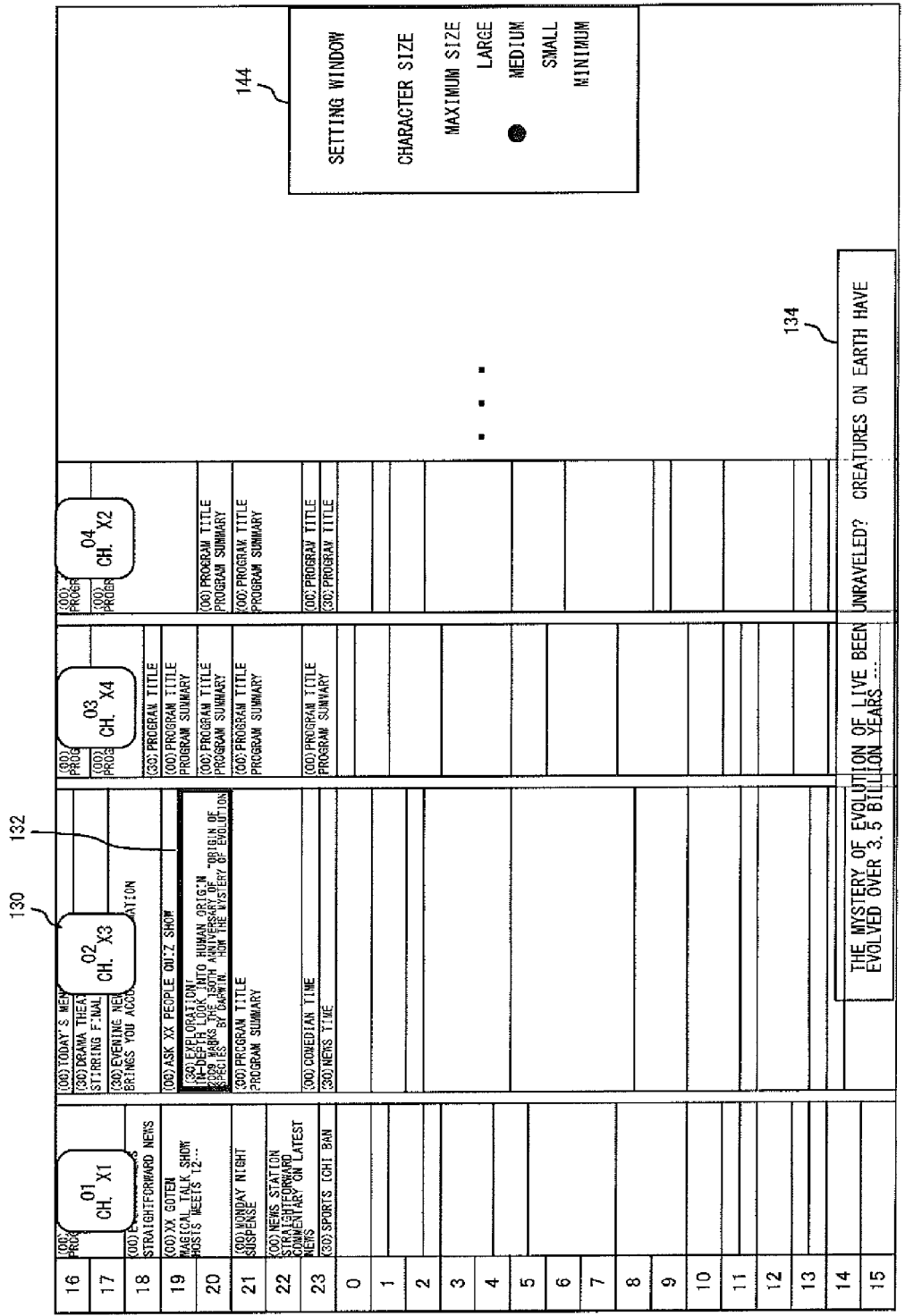
FIG. 17 shows an exemplary second program guide as displayed.

Further, the second program guide displaying unit 94 temporarily displays a setting window for setting the character font of the second program guide on the display 14 along with the second program guide. FIG. 17 shows an exemplary second program guide as displayed. When a particular character font is designated by the viewer in the setting window 144, the second program guide displaying unit 94 immediately reflects the designated character font in the second program guide. In other words, the second program guide as displayed is switched to the guide in which program information is shown using the designated character font. FIG. 17 shows an example in which the character size is changed. Alternatively, the character style, i.e., the type face, may be similarly changed.

The second program guide displaying unit 94 scrolls the second program guide in the time axis direction or the channel axis direction in accordance with the movement of the cursor 132 in the second program guide, thereby switching the displayed content in the second program guide. As regards the program frame a part of which is no longer displayed as a result of the scrolling in the time axis direction and which shows a program that has not been completely broadcast yet, the second program guide displaying unit 94 displays the program information that should be displayed in that program frame in an area that remains displayed after the scrolling, starting at the head of the program information. In other words, the unit 94 displays "broadcast start time indicated by minutes+program title" in preference to the program summary.

FIGS. 18A and 18B show exemplary second program guide as displayed. In this case, it is assumed that the current time is 17:45. FIG. 18A shows the second program guide displayed before scrolling. The figure shows a program guide for a time zone 16:00-20:00. Meanwhile, FIG. 18B shows the second program guide displayed after scrolling. The figure shows a program guide for a time zone 17:00-21:00. When the cursor 132 is moved downward in FIG. 18A, the display is switched to FIG. 18B.

The display area of program frames 146, 147, and 148 of FIG. 18B is reduced as compared to the status in FIG. 18A. Since the program of the program frame 146 is currently broadcast, the second program guide displaying unit 94 displays as much of the program information as can be fitted in the area of the program frame 146 that remains displayed, starting at the head of the information. In other words, the position where the program information as displayed starts is shifted to the head of the remaining area.

Meanwhile, since the programs for the program frames 147 and 148 have already been broadcast, the second program guide displaying unit 94 does not change the position where the program information as displayed starts. The second program guide displaying unit 94 may display the program information of the program that has already been broadcast in a mode not so noticeable as that of the program information of the program not completely broadcast yet (e.g., using a light gray character color), and may not change the position where the program information starts in the program frame displayed in that mode.

Referring back to FIG. 6, when the video icon 102e is selected in the portal screen, the video control screen displaying unit 96 displays a video screen for controlling the operation of recording/playing back the program on the display 14. The video control displaying unit 96 includes a recording list displaying unit 98. The recording list displaying unit 98 displays a list of recordings that includes information on recorded content and a list of programmed recordings.

FIG. 19 shows an exemplary video screen showing a list of recordings. A list of recordings 150 shows a list of titles, recoded date and time, status, and playback progress rate of the recorded programs. A status field contains information indicating the status of recorded content. For example, the information may indicate whether the content is recorded, programmed to be recorded, or whether an error has occurred. A playback progress rate field contains a value indicating the degree of progress of the playback of the recorded content. The video control screen displaying unit 96 refers to the recording information in the recording information storage unit 52 to set values in the respective fields of the list of recordings. When a playback button 152 is selected by the viewer, the playback processing unit 66 starts playing back the recorded content corresponding to the playback button 152.

In one variation, the list of recordings in the video screen may contain only the information related to the content already recorded. In this case, the information on programmed recording may be displayed in a schedule screen at the destination of transition reached when the schedule icon 102d is selected in the portal screen.

Referring back to FIG. 6, the viewing status communicating unit 99 periodically transmits viewing status data to the information management server 16. The viewing status data associates the program ID of the program currently displayed by the program image displaying unit 84, i.e., the program ID of the program currently viewed by the viewer, with the attribute information of the viewer. Further, the viewing status communicating unit 99 refers to the recording information in the recording information storage unit 52 and periodically transmits viewing status data to the information management server 16. The viewing status data associates the program ID of the program programmed to be recorded with the attribute information of the viewer. The frequency of communicating the viewing status may be determined in light of the real time performance required to collect viewing status and of the network and system load, comparing the requirements. For example, the information may be communicated once in every one minute, for example.

Figure 20:
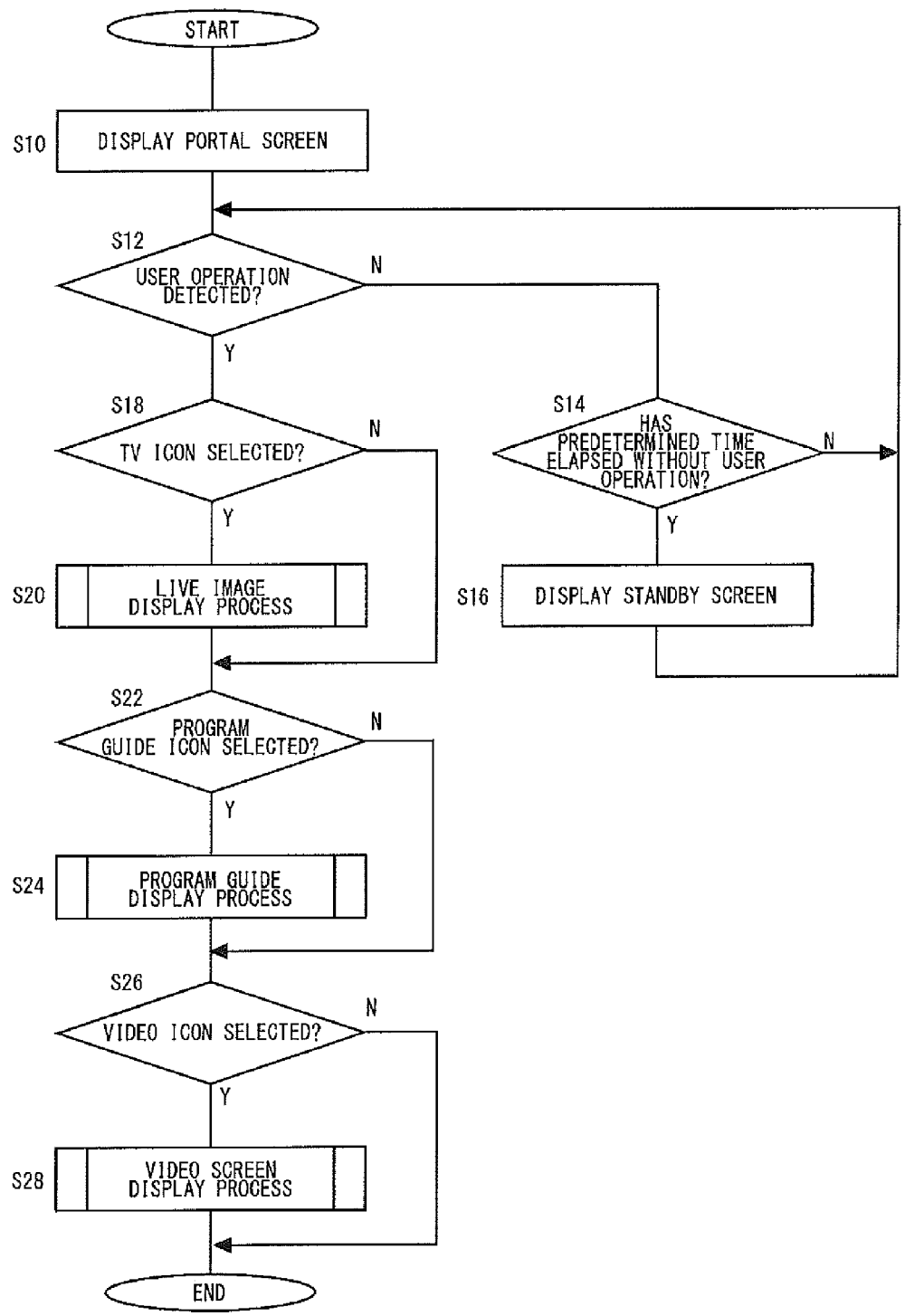
FIG. 20 is a flowchart showing the operation of the information processing apparatus.

A description will now be given of the operation in the configuration described above. FIG. 20 is a flowchart showing the operation of the information processing apparatus 11. The figure primarily shows the operation initiated via a user interface. When an instruction for starting the program viewer AP is acknowledged in the information processing apparatus 11, the portal screen displaying unit 80 displays a portal screen (S10). When a user operation is not detected (N in S12) and a predetermined period of time or more has elapsed in that state (Y in S14), the standby screen displaying unit 82 displays a standby screen (S16), whereupon a determination in S12 is performed for a second time. When the elapsed time is less than the predetermined period of time (N in S14), control is returned to S12 without displaying a standby screen.

In the portal screen, the latest information pop 104 is displayed in association with each of the icons for selecting respective functional screens. The status tag 106 indicating the viewing status or operating status is also displayed. In this way, the viewer can view the useful latest information in the portal screen without making a transition to each functional screen. Consequently, viewer convenience is improved. By displaying a thumbnail image of recorded content in the portal screen or standby screen, the viewer can not only view the recorded content but also enjoy viewing the history of recording. For example, since the standby screen shows a thumbnail image in a varying mode, the standby screen may be displayed as some sort of an interior decoration. By allowing a thumbnail image to be displayed in a mode that varies depending on the date and time of recording, the viewer can easily identify and determine a recorded content to view.

When a viewer operation is detected (Y in S12), the standby screen displaying unit 82 terminates the display of the standby screen if it is being displayed. When the operation of selecting the TV icon 102a is detected (Y in S18), a live image display process described later is performed (S20). When the detected operation is not the selection of the TV icon 102a (N in S18), S20 is skipped. When the operation of selecting the program guide icon 102b is detected (Y in S22), a program guide display process described later is performed (S24). It the detected operation is not the selection of the program guide icon 102b (N in S22), S24 is skipped. When the operation of selecting the video icon 102e is selected (Y in S26), a video screen display process described later is performed (S28). When the detected operation is not the selection of the video icon 102e (N in S26), S28 is skipped. When another on-screen selection icon 102 is selected in the portal screen, the process of displaying a screen corresponding to the selected icon is performed (not shown in the figure).

Figure 21:
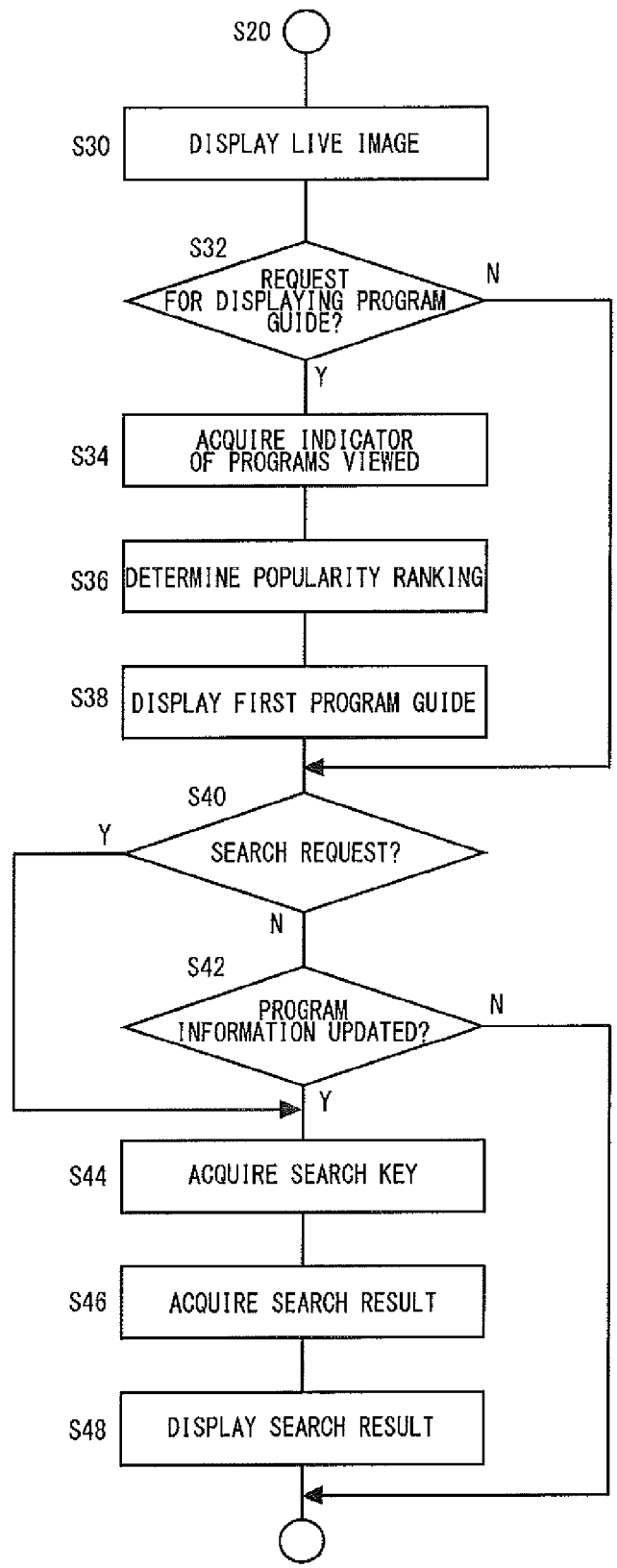
FIG. 21 is a flowchart showing S20 of FIG. 20 in further detail.

FIG. 21 is a flowchart showing S20 of FIG. 20 in further detail. The program image acquisition unit 58 acquires the image data for the program selected by the viewer from the tuner 13, and the program image displaying unit 84 displays the live image of the program in the image display screen 110 (S30). When a request for displaying a program guide is acknowledged (Y in S32), the indicator acquisition unit 68 acquires the live indicator and the programmed recording indicator from the information management server 16 (S34), the popularity determination unit 70 determines the ranking of popularity of the programs according to the indicators (S36). The first program guide displaying unit 92 displays the first program guide associating the program information of the programs being broadcast with the rank of popularity, superimposing the guide on the image display screen 110 (S38). When a request for displaying a program guide is not acknowledged (N in S32), S34 through S38 are skipped.

When a ranking determination interval (e.g., one minute) corresponding to the interval of collecting the viewing status in the information management server 16 elapses, the indicator acquisition unit 68 acquires the latest indicators from the information management server 16 (not shown in FIG. 21). The popularity determination unit 70 updates the popularity rank of each program in accordance with the latest indicators.

The first program guide displaying unit 92 displays the updated popularity ranking of the programs in the first program guide.

By displaying the first program guide showing ranking indicators along with the live image of the program, the viewer can know programs that are currently popular at a glance while viewing the desired program. In this embodiment, the viewing status is identified based on a viewing action that can be objectively identified (e.g., viewing of a program or a programming of a recording). In this way, viewing status can be identified that is more precise than base upon the viewer's subjective indicator of the program (e.g., "like", "dislike", "intend to view", or the like), i.e., more properly representing the situation.

Since the channel can be switched by controlling the first program guide, the viewer can select a program of interest as needed based on the changing ranking order. Since the first program guide shows the progress status of the programs or the status of transition in popularity, the viewer can select a program to view by referring to the status. Since the program summary of the program selected by the cursor is displayed in the program summary field 124, allowing the scrolling of the display, the area occupied by the first program guide is controlled while allowing the viewer to view a desired program summary. This helps maintain the viewability of program image.

When a request for a search is acknowledged while the program image is being displayed (Y in S40), or when the information related to the program being displayed is updated (Y in S42) absent an explicit search request (N in S40), the search key acquisition unit 74 acquires a search key from the program information (S44). The search execution unit 76 transmits a search request to the search server 17 and receives a result of the search (S46). The search result displaying unit 86 displays the browser screen 114 showing the web page retrieved by the search side by side with the image display screen 110 (S48). Absent an explicit search request and updating of the program related information (N in S42), S44-S48 are skipped so that the flow of the figures is terminated.

According to this embodiment, various information related to the program viewed is acquired from web sites on the Internet and presented to the viewer along with the program image. This allows the user to view a variety of information, i.e., information not limited to typical program guide information, associated with the program viewed. Further, since a search key is automatically retrieved from the program information, it is not necessary for the viewer to designate a search key. When the information related to a program is updated, the information displayed in the browser screen 114 is updated as changes occur. In this way, the viewer can view a search result updated based on the latest information on the program without performing a specific operation and can continue to view the program image.

Figure 22:
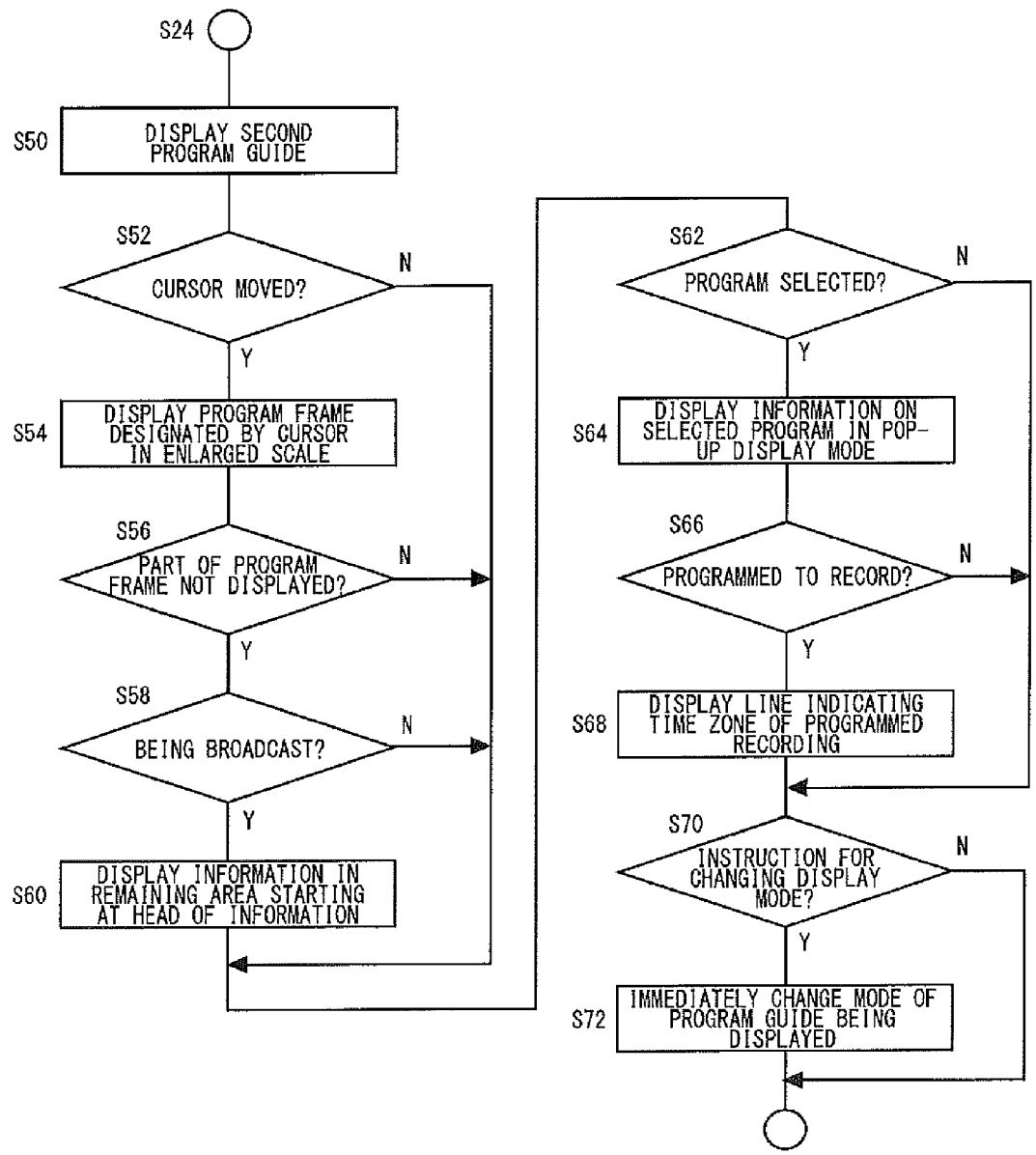
FIG. 22 is a flowchart showing S24 of FIG. 20 in further detail.

FIG. 22 is a flowchart showing S24 of FIG. 20 in further detail. The second program guide displaying unit 94 displays the second program guide based on the program information in the program information storage unit 50 (S50). The cursor displaying unit 90 moves the display position of the cursor across a plurality of program frames in the second program guide in accordance with the viewer operation. When the cursor is moved (Y in S52), the second program information displaying unit 94 displays the program frame designated by the cursor, i.e., the program frame of the temporarily selected program, on a larger scale than the program frames for the other channels (S54).

A part of the program frame goes out of the view in association with the movement of the cursor (Y in S56). When the program frame is for the program being broadcast (Y in S58), the second program guide displaying unit 94 displays the program information in the remaining area, starting at the head of the information (S60). When the program frame is for the program already broadcast (N in S58), S60 is skipped. When none of the parts of the program frame goes out of the view (N in S56), S58 and S60 are skipped. When the cursor is not moved (N in S52), S54-S60 are skipped.

Subsequently, when the program that the viewer desires to control for viewing is selected in the second program guide, i.e., when the program is formally selected (Y in S62), the second program guide displaying unit 94 displays the program information on the selected program in the program detail window 136 in a pop-up display mode (S64). In this case, the control icon 138 is displayed to accompany the program detail window 136. The second program guide is displayed in the background in a blurred manner. When the recording of the formally selected program is programmed (Y in S66), the second program guide displaying unit 94 displays the programmed recording line 142 indicating the time zone of the programmed recording in the second program guide (S68).

When the recording is not programmed (N in S66), S68 is skipped. When the program is not formally selected (N in S62), S64-S68 are skipped. When an instruction for changing the display mode of the second program guide (e.g., change in character size, change in size of program frame, etc.) is acknowledged (Y in S70), the second program guide displaying unit 94 immediately changes the display mode of the second program guide (S72). When an instruction for changing the display mode is not acknowledged (N in S70), S72 is skipped.

According to this embodiment, the area of the program frame in the second program guide selected by the cursor is dynamically enlarged so that more program information is displayed than before the selection. This reduces necessity for the viewer to perform an extra operation of, for example, displaying another screen to view program information. In other words, the viewer operation for viewing program information is simplified so that the convenience of the electronic program guide is improved. By superimposing the program detail window 136 on the second program guide, the viewer is allowed to perform an operation for viewing the program, while maintaining an impression of the time or program position viewed in the second program guide. By reducing the image quality of the second program guide in the background of the program detail window 136, the viewability of the program detail window 136 is relatively improved.

The display mode of the second program guide is changed as needed in accordance with user control while maintaining the display of the second program guide, i.e., without making a transition to another setting screen. This provides the viewer with immediate feedback resulting from the change in the display mode. For example, the viewer can immediately view the change in viewability. Further, by setting the programmed recording line 142 in the second program guide in association with the programmed recording, the viewer can easily view the status of programmed recording even if the viewer cannot directly view the program frame of the program programmed to be recorded due to a large number of channels. This helps prevent duplicate programmed recordings or unexpected overwriting, for example.

By displaying the program frame that partly goes out of the view, starting at the head of the information that should be displayed, important information (program title, etc.) is displayed in the remaining area of the program frame preferentially. When the program information is displayed, starting in the middle of the information, the viewer will not be able to determine which program the information is about. By displaying the information from the start, the viewer can know the program content easily. By sliding only the program information of the program being broadcast into view in the program frame, only the program content of the program that the viewer can view is presented in an easily distinguishable manner.

Figure 23:
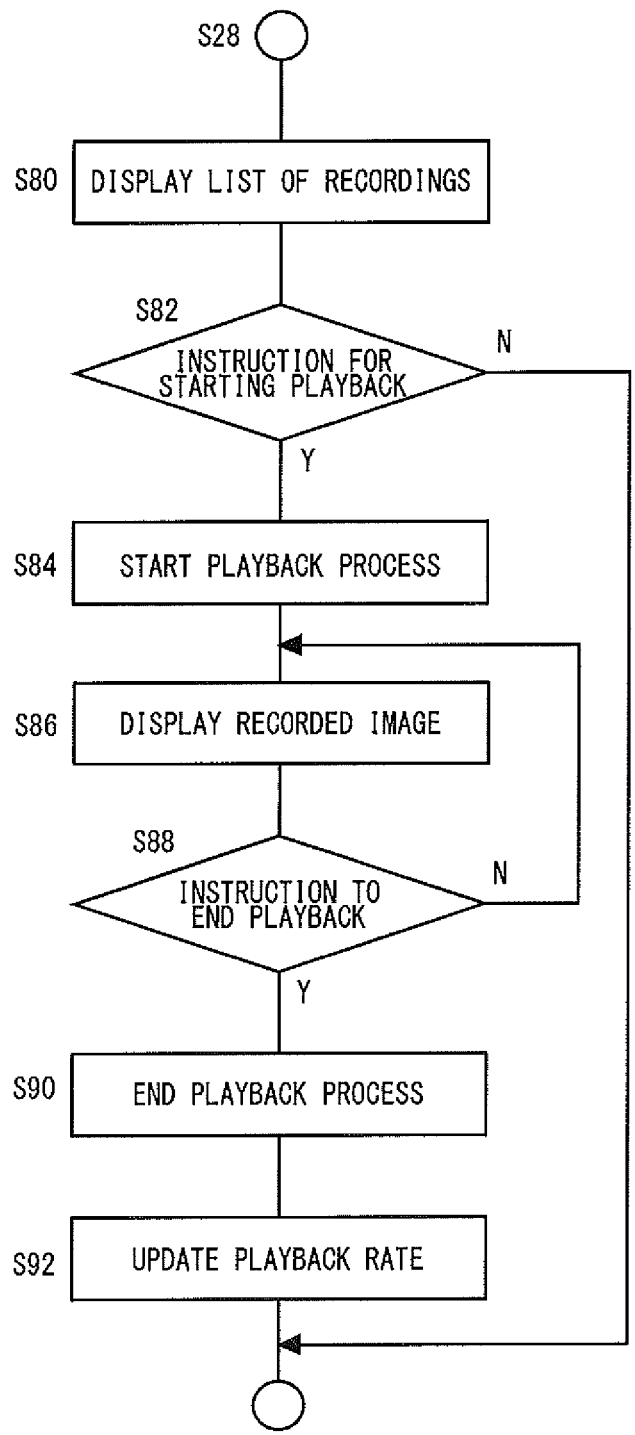
FIG. 23 shows S28 of FIG. 20 in further detail.

FIG. 23 shows S28 of FIG. 20 in further detail. The video operation screen displaying unit 96 displays a video screen, and the recording list displaying unit 98 displays a list of recordings 150 in the video screen (S80). In the list of recordings, the recorded content suspended in the middle of playback is displayed in a mode to indicate as such. More specifically, the playback progress rate indicating the progress of playback is displayed in association with each of the recorded content. This helps the viewer efficiently determine the recorded content to play back.

When an instruction to start playback is acknowledged (Y in S82), the playback processing unit 66 starts playing back the recorded content (S84) and sends the data for recorded image to the program image displaying unit 84. The program image displaying unit 84 displays the recorded image on the display 14 (S86). When an instruction to end the playback is not acknowledged (N in S86), control is returned to S86. When an instruction to end the playback is acknowledged (Y in S88), the playback processing unit 66 ends the process of playing back the recorded content and stores the playback progress rate occurring at that moment in the recorded information storage unit 52 (S92). When an instruction to start playback is not acknowledged (N in S82), S84-S92 are skipped.

Figure 24:
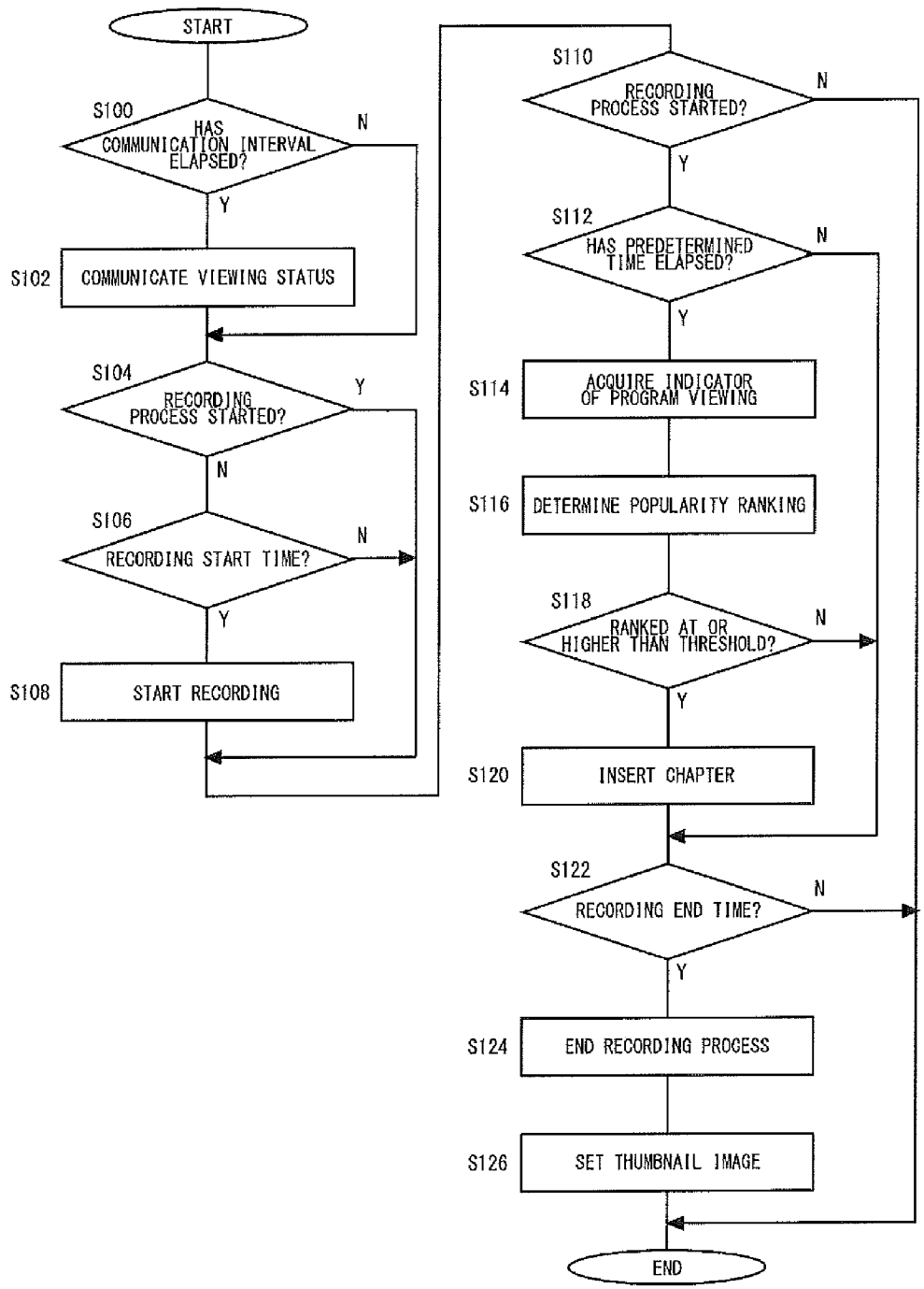
FIG. 24 is a flowchart showing the operation of the information processing apparatus.

FIG. 24 is a flowchart showing the operation of the information processing apparatus 11. The figure primarily shows the operation performed as a background process. When a predetermined interval for notification (e.g., one minute) has elapsed (Y in S100), the viewing status communicating unit 99 notifies the information management server 16 of the program ID of the program currently being broadcast and the program ID of the program already programmed to be recorded (S102). When an interval for notification has not elapsed (N in S100), S102 is skipped. The recording processing unit 64 refers to the recording information in the recording information storage unit 52 and performs the programmed recording process. In other words, when the recording process is not started (N in S104) and when the recording start time comes (Y in S106), the recording processing unit 64 starts the recording process (S108). When the recording start time has not come (N in S106), S108 is skipped. When the recording process is already started (Y in S104), S106 and S108 are skipped.

When the recording process is already started (Y in S110) and when a predetermined ranking determination interval (e.g., one minute) has elapsed (Y in S112), the indicator acquisition unit 68 acquires the live indicator and the programmed recording indicator from the information management server 16 (S114). The popularity determination unit 70 determines the popularity ranking in accordance with the indicators (S116). When the program being recorded is ranked at or higher than a predetermined rank (Y in S118), the recording processing unit 64 inserts a chapter in the recorded data (S120). When the program being recorded is not ranked at or higher than a predetermined rank (N in S118), S120 is skipped. When the ranking determination interval has not elapsed (N in S112), S114-S120 are skipped. By inserting a chapter in the recorded content, the viewer can easily search for and identify the start of a scene that is popular to viewers, when playing back the recorded content.

When the recording end time comes (Y in S122), the recording processing unit 64 ends the recording process (S124). The thumbnail setting unit 72 sets a thumbnail image from the recorded video and image occurring when the program is ranked at or higher than a predetermined rank and stores the thumbnail image in the thumbnail storage unit 54 (S126). When the recording end time does not come (N in S122), S124 and S125 are skipped. When the recording process is not started yet (N in S110), S112-S126 are skipped. According to this embodiment, the scene that is popular to viewers is turned into a thumbnail image so that the recorded content is more easily identified by a thumbnail image.

Described above is an explanation based on an exemplary embodiment. The embodiment is intended to be illustrative only and it will be obvious to those skilled in the art that various modifications to constituting elements and processes could be developed and that such modifications are also within the scope of the present invention. A description will now be given of variations to the embodiment.

The first variation will be described. The search key acquisition unit 74 of the embodiment uses program information acknowledged as EPG information as a search key. In one variation, the information processing apparatus 11 may additionally be provided with a caption information acquisition unit that acquires caption information in character multiplex broadcast (so-called caption multiplex broadcast) from the tuner 13. The search key acquisition unit 74 may use a caption character string included in the caption information as a search key. For example, the unit 74 may subject the caption character string to morphological analysis and use a noun phrase included in the caption character string as a search key. Alternatively, when the caption information acquisition unit acquires new caption information, the search key acquisition unit 74 may allow the search execution unit 76 to perform a new search using the caption character string included in the new caption information as a new search key.

The second variation will be described. The search key acquisition unit 74 may acquire a search key in accordance with the live indicator or programmed recording indicator acquired by the indicator acquisition unit 68 or the popularity ranking of the programs determined by the popularity determination unit 70. According to this variation, a search result useful for the viewer can easily be provided by using the program related information available when the popularity of the program is increased as a search key.

For example, a search key may be acquired from the program information or caption character string available when the live indicator, programmed recording indicator, or a sum thereof of a program reaches a predetermined value or higher while the image of the program is being displayed. Alternatively, a search key may be acquired from the program information or caption character string available when a program reaches a certain popularity rank or higher while the image of the program is being displayed. The caption character string, indicator, and history of popularity rank may be stored in the data storage unit 48 in association with the program ID, and the search key acquisition unit 74 may acquire a search key based on the history information while the recorded content is being played back.

The third variation will be described. In the embodiment, the first program guide is assumed to be displayed in a display mode reflecting the popularity ranking of the programs, and no reference is made to the second program guide. In one variation, the second program guide may also be displayed in a display mode reflecting the popularity ranking of the programs. In this case, the second program guide displaying unit 94 may change the display mode (e.g., color, character font, etc.) of the program frames of the second program guide in accordance with the popularity ranking determined by the popularity determination unit 70. Alternatively, the popularity indicator or the data for an indicator itself may be displayed in association with the program frame. This variation provides the viewer with information useful for the viewer that selects a program for view in the second program guide. For example, a program programmed by a lot of viewers to be recorded can be suggested to the viewer, thereby helping the viewer to determine a program that should be programmed for recording.

The fourth variation will be described. The first program guide displaying unit 92 may dynamically change the size of a program frame for each channel, typically the length in the direction of channel axis, in accordance with the attribute or propensity of the viewer or the information related to the program. For example, the unit 92 may refer to the age group or sex of the viewer and display program frames for channels that are more likely to be viewed by viewers having a selected attribute on a larger scale. Alternatively, the higher the current popularity rank, the larger the program frame of the program may be displayed. The program frame for a channel in which the broadcasting of a program ends and that of the next program has not been started may be displayed on a smaller scale than the program frames for the other channels in which programs continue to be broadcast. According to this variation, the viewability of program frames for channels that are likely to be selected by viewers is improved and the volume of displayable program information can be increased.

The fifth variation will be described. The program image acquisition unit 58 may acquire from the tuner 13 the program image currently ranked at a predetermined rank (typically, No. 1) or higher as determined by the popularity determination unit 70. When the popularity ranking changes, the channel from which to acquire image information may be dynamically switched in accordance with the change. The program image display unit 84 displays the program image acquired by the program image acquisition unit 58 in accordance with the change in popularity ranking on the display 14. According to this variation, a program that is popular to viewers is automatically selected so that the display 14 always displays the image of a popular program. This implements a sort of zapping without viewer intervention.

The sixth variation will be described. When playing back the recorded content, the playback processing unit 66 may communicate the information indicating as such to the information management server 16 along with the program ID. The information management server 16 may periodically supply the information processing apparatus 11 with a playback ratio indicating the ratio of viewers that have played back the recorded content with respect to the viewers having programmed the program with the program ID to be recorded, associating the ratio with the program ID. The playback ratio is stored in the recording information in the recording information storage unit 52. The list of recordings displaying unit 98 may further display the playback ratio in association with each recorded content in the list of recordings. The viewer may select one of the plurality of recorded contents for view by referring to the playback ratio of the recorded contents.

The seventh variation will be described. The recording processing unit 64 may record the live image ranked at or higher than a predetermined rank (typically, No. 1) even without a viewer operation for recording. In this case, the recording processing unit 64 dynamically changes the live image recorded in accordance with a change in popularity ranking. According to this variation, the live image of a popular program is always recorded in the background. The viewer can later view a program image popular to other viewers in an efficient manner.

This variation is particularly suitable in the program viewing system 10 provided with a plurality of tuners 13. According to the embodiment, the viewer can refer to the first program guide and know that the popularity of a program different from the program that the viewer is viewing is increased. However, the viewer may find it difficult to view the very program image that caused the increase in popularity even if the viewer switches to the other program. According to this variation, program images that become popular are always recorded so that the viewer does not miss out on viewing program images that become popular. As a result, viewer convenience is improved.

The eighth variation will be described. When a certain viewer operation regarding the cursor movement in the second program guide is acknowledged, the cursor displaying unit 90 may allow program frames of programs programmed for recording to be successively selected by the cursor. According to this variation, the viewer can efficiently select the program programmed to be recorded in the second program guide.

The ninth variation will be described. In the embodiment, the popularity ranking of the programs is determined in the information processing apparatus 11. In a variation, the information management server 16 may determine the popularity ranking of the programs across the entire attributes of viewers and the popularity ranking for each viewer attribute. In this case, the indicator acquisition unit 68 of the information processing apparatus 11 may acquire the popularity ranking as the indicator from the information management server 16. The popularity determination unit 70 may directly output the popularity ranking thus acquired to the data processing unit 56.

The tenth variation will be described. In the embodiment, the history of popularity ranking is stored in the information processing apparatus 11. In a variation, the history of indicators originating the popularity ranking may be stored in the information management server 16. For example, the information management server 16 may further be provided with a tally history storage unit, which may store the tally result of viewing status as a tally history, associating the result with date and time information. In acquiring the popularity ranking of programs broadcast in the past in the information processing apparatus 11 (e.g., in playing back a recorded content), the apparatus may acquire the tally history from the information management server 16 to determine the popularity ranking in the past.

The eleventh variation will be described. In the embodiment, the program information acquisition unit 60 acquires EPG information from the tuner 13. In a variation, the program information acquisition unit 60 may acquire EPG information from an information provider server on the Internet 15 via the Internet 15. Further, the program information acquisition unit 60 may acquire EPG information from the tuner 13 and acquire program related information that should be appended to the EPG information and displayed in the electronic program guide via the Internet 15.

The twelfth variation will be described. The functions of the information processing apparatus 11 described in the embodiment may be implemented in the tuner 13. In this case, the tuner 13 may include the CPU 300, GPU 302, main memory 308, hard disk drive 334, network card 330, and interface 332 shown in FIG. 5. The functions shown in FIG. 6 may be implemented by the tuner.

Optional combinations of the embodiment and the variations may also be useful. New modes of practicing the invention created by combinations will provide the advantages of the embodiment and variations combined.

It should be under stood to those skilled in the art that each function that should be achieved by the constituting elements as claimed is implemented by each constituting element indicated in the embodiment and variations, or by combination of the elements.

[Description of the Reference Numerals]

11 Information Processing Apparatus, 58 Program Image Acquisition Unit, 60 Program Information Acquisition Unit, 62 Attribute Acquisition Unit, 64 Recording Processing Unit, 66 Playback Processing Unit, 68 Indicator Acquisition Unit, 70 Popularity Determination Unit, 72 Thumbnail Setting Unit, 74 Search Key Acquisition Unit, 76 Search Execution Unit, 80 Portal Screen Displaying Unit, 82 Standby Screen Displaying Unit, 84 Program Image Displaying Unit, 86 Search Result Displaying Unit, 88 Program Guide Displaying Unit, 90 Cursor Displaying Unit, 92 First Program Guide Displaying Unit, 94 Second Program Guide Displaying Unit, 96 Video Control Screen Displaying Unit, 98 Recording List Displaying Unit, 99 Viewing Status Communicating Unit, 100 Information Processing System The present invention can be used in information processing devices related to viewing of broadcast programs.

The invention claimed is:

1. An information processing apparatus comprising:
a portal screen displaying unit configured to display a portal screen that serves as a source of transition for a plurality of screens related to the viewing of a program on a predetermined display device;
an indicator acquisition unit configured to acquire an indicator indicative of the number of viewers viewing a program being broadcast; and
a popularity determination unit configured to determine the popularity of the program being broadcast in accordance with the indicator;
a reduced image setting unit configured to set a reduced image indicating the content of a recorded program; and
a standby screen displaying unit,
wherein the portal screen displaying unit displays on the portal screen an object to be selected to transition to a screen for viewing the program being broadcast and displays information indicating the popularity of the program, and displays the reduced image on the portal screen, and
wherein the standby screen displaying unit displays on the display device a standby screen showing the reduced image in a varying mode, when a user operation in the portal screen is not detected within a predetermined period of time.

2. The information processing apparatus according to claim 1,
wherein the standby screen displaying unit changes a mode of display of the reduced image depending on attribute information of the program from which the reduced image originates.

3. An information processing apparatus comprising:
a portal screen displaying unit configured to display a portal screen that serves as a source of transition for a plurality of screens related to the viewing of a program on a predetermined display device;
a reduced image setting unit configured to set a reduced image indicating the content of a recorded program; and
a standby screen displaying unit, wherein the portal screen display unit further displays the reduced image on the portal screen, and wherein the standby screen displaying unit displays on the display device a standby screen showing the reduced image in a varying mode, when a user operation in the portal screen is not detected within a predetermined period of time.

4. The information processing apparatus according to claim 3, wherein the portal screen displaying unit further displays on the portal screen an object to be selected to transition to a screen in which a video-related operation is performed, and displays a viewing status based on the video-related operation.

5. The information processing apparatus according to claim 4, further comprising:

a recording list display unit configured to display a list of recorded programs in the screen in which a video-related operation is performed, and to display in the list a program suspended in the middle of playback, using a mode to indicate as such.

6. The information processing apparatus according to claim 5, wherein the recording list displaying unit displays in the list a program suspended in the middle of playback, using a mode indicating a playback progress status.

7. The information processing apparatus according to claim 4, further comprising:

a recording processing unit configured to record an image of the program in accordance with the video-related operation, and, when the program being recorded is ranked at or above a predetermined rank, the recording processing unit inserts information indicating as such in the recorded data.

8. The information processing apparatus according to claim 4, further comprising:

a playback processing unit configured to play back recorded data of a program in accordance with the video-related operation and configured to determine a portion to be played back according to a history of the popularity of the program.

9. An information processing apparatus comprising:

a reduced image setting unit configured to set a reduced image indicating the content of a recorded program; and a display processing unit configured to display a first screen related to viewing of a program on a predetermined display device and display the reduced image in the first screen, wherein the display processing unit displays a second screen on the display device showing the reduced image in a varying mode, when a user operation in the first screen is not detected within a predetermined period of time.

10. The information processing apparatus according to claim 9, wherein the display processing unit changes a mode of display of the reduced image depending on attribute information of the program from which the reduced image originates.

11. A tuner adapted to receive a broadcast signal on a selected channel, comprising:

a reduced image setting unit configured to set a reduced image indicating the content of a recorded program; and a display processing unit configured to display a first screen related to viewing of a program on a predetermined display device and display the reduced image in the first screen, wherein the display processing unit displays a second screen on the display device showing the reduced image in a varying mode, when a user operation in the first screen is not detected within a predetermined period of time.

12. An information processing method executed by an information processing apparatus, comprising:

setting a reduced image indicating the content of a recorded program;

displaying a first screen related to viewing of a program on a predetermined display device and displaying the reduced image in the first screen; and displaying a second screen on the display device showing the reduced image in a varying mode, when a user operation in the first screen is not detected within a predetermined period of time.

13. A computer program embedded in a computer-readable medium comprising:

a module configured to set a reduced image indicating the content of a recorded program;

a module configured to display a first screen related to viewing of a program on a predetermined display device and displaying the reduced image in the first screen; and a module configured to display a second screen on the display device showing the reduced image in a varying mode, when a user operation in the first screen is not detected within a predetermined period of time.

14. An information processing apparatus comprising:

a portal screen displaying unit configured to display a portal screen that serves as a source of transition for a plurality of screens related to the viewing of a program on a predetermined display device;

an indicator acquisition unit configured to acquire an indicator indicative of the number of viewers viewing a program being broadcast;

a popularity determination unit configured to determine the popularity of the program being broadcast in accordance with the indicator; and a recording processing unit configured to record an image of the program in accordance with a video-related operation, wherein the portal screen displaying unit displays on the portal screen an object to be selected to transition to a screen for viewing the program being broadcast and displays information indicating the popularity of the program, wherein the portal screen displaying unit further displays on the portal screen an object to be selected to transition to a screen in which the video-related operation is performed and displays a viewing status based on the video-related operation, and wherein, when the program being recorded is ranked at or above a predetermined rank, the recording processing unit inserts information indicating as such in recorded data.

* * * * *